United States Patent [19]

Bridges et al.

[11] E Re. 30,738

[45] Reissued Sep. 8, 1981

[54] APPARATUS AND METHOD FOR IN SITU HEAT PROCESSING OF HYDROCARBONACEOUS FORMATIONS

[75] Inventors: Jack Bridges, Park Ridge; Allen Taflove, Wilmette, both of Ill.

[73] Assignee: IIT Research Institute, Chicago, Ill.

[21] Appl. No.: 118,957

[22] Filed: Feb. 6, 1980

Related U.S. Patent Documents

Reissue of:

[64] Patent No.: 4,144,935
Issued: Mar. 20, 1979
Appl. No.: 828,621
Filed: Aug. 29, 1977

[51] Int. Cl.[3] ..... E21B 43/24; E21B 43/30

[52] U.S. Cl. ..... 166/248; 166/60; 166/65 R; 166/245; 166/272; 219/10.55 R

[58] Field of Search ..... 166/248, 60, 57, 302, 166/245, 50, 52, 65 R; 219/10.55 R, 10.65, 10.81

[56] References Cited

U.S. PATENT DOCUMENTS

| | | | |
|---|---|---|---|
| 2,685,930 | 8/1954 | Albaugh | 166/248 UX |
| 2,757,738 | 8/1956 | Ritchey | 166/248 |
| 3,133,592 | 5/1964 | Tomberlin | 166/60 |
| 3,169,577 | 2/1965 | Sarapuu | 166/248 |
| 3,170,519 | 2/1965 | Haagensen | 166/60 |
| 3,208,674 | 9/1965 | Bailey | 166/248 X |
| 3,954,140 | 5/1976 | Hendrick | 166/60 X |
| 4,140,179 | 2/1979 | Kasevich et al. | 166/60 X |
| 4,193,451 | 3/1980 | Dauphine | 166/248 |

OTHER PUBLICATIONS

DuBow, J., "Electrical and Thermal Properties of Oil Shale of Interest to In-Situ Shale Oil Extraction," National Science Foundation Report—NSF/RA-770043, PB 267136, Jan. 1977, pp. 40-44.

Fu, "Gasification of Fossil Fuels in a Microwave Discharge in Argon", Chemistry 2d Industry, Jul. 31, 1971, pp. 876, 877.

Fu et al., "Pyrolysis of Coals in a Microwave Discharge", Industrial & Engineering Chemistry, Process Design and Development, vol. 8, No. 2, Apr. 1969, pp. 257-262.

*Primary Examiner*—Stephen J. Novosad

[57] ABSTRACT

The disclosure describes a technique for uniform heating of relatively large blocks of hydrocarbonaceous formations in situ using radio frequency (RF) electrical energy that is substantially confined to the volume to be heated and effects of dielectric heating of the formations. An important aspect of the disclosure relates to the fact that certain hydrocarbonaceous earth formations, for example raw unheated oil shale, exhibit dielectric absorption characteristics in the radio frequency range. In accordance with the system of the invention, a plurality of conductors are inserted in the formations and bound a particular volume of the formations. The phrase "bounding a particular volume" is intended to mean that the volume is enclosed on at least two sides thereof. Electrical excitation is provided for establishing alternating electric fields in the volume. The frequency of the excitation is selected as a function of the dimensions of the volume so as to establish a substantially non-radiating electric field which is substantially confined in the volume. In this manner, volumetric dielectric heating of the formations will occur to effect approximately uniform controlled heating of the volume.

97 Claims, 20 Drawing Figures

Distribution of the Total Electric Field and Heating Potential Along a Sample Tri-Plate Line In Situ RF Retort Modified Distribution of the Heating Potential
Along the Same Tri-Plate Line of Fig. 8

APPARATUS AND METHOD FOR IN SITU HEAT PROCESSING OF HYDROCARBONACEOUS FORMATIONS

Matter enclosed in heavy brackets [ ] appears in the original patent but forms no part of this reissue specification; matter printed in italics indicates the additions made by reissue.

BACKGROUND OF THE INVENTION

This invention relates to the exploitation of hydrocarbon-bearing earth formations, and, more particularly, to a system and method for the in situ heating processing of hydrocarbon-bearing earth formations such as oil shale, tar sands, coal, heavy oil, and other bituminous or viscous petroliferous deposits. The present subject matter is related to subject matter set forth in the copending U.S. application Ser. No. 828,904, of Jack Bridges, Allen Taflove and Richard Snow, filed of even date herewith and assigned to the same assignee as the present application.

Large scale commercial exploitation of certain hydrocarbon-bearing resources, available in huge deposits on the North American continent, has been impeded by a number of problems, especially cost of extraction and environmental impact. The United States has tremendous coat resources, but deep mining techniques are hazardous and leave a large percentage of the deposits in the earth. Strip mining of coal involves environmental damage or expensive reclamation. Oil shale is also plentiful in the United States, but the cost of useful fuel recovery has been generally noncompetitive. The same is true for tar sands which occur in vast amounts in Western Canada. Also, heavy or viscous oil is left untapped, due to the extra cost of extraction, when a conventional oil well is produced.

Materials such as oil shale, tar sands, and coal are amenable to heat processing to produce gases and hydrocarboneous liquids. Generally, the heat develops the porosity, permeability and/or mobility necessary for recovery. Oil shale is a sedimentary rock which, upon pyrolysis or distillation, yields a condensable liquid, referred to as a shale oil, and non-condensable gaseous hydrocarbons. The condensable liquid may be refined into products which resemble petroleum products. Oil sand is an erratic mixture of sand, water and bitumen with the bitumen typically present as a film around water-enveloped sand particles. using various types of heat processing the bitumen can, with difficulty, be separated. Also, as is well known, coal gas and other useful products can be obtained from coal using heat processing.

In the destructive distillation of oil shale or other solid or semi-solid hydrocarbonaceous materials, the solid material is heated to an appropriate temperature and the emitted products are recovered. This appears a simple enough goal but, in practice, the limited efficiency of the process has prevented achievement of large scale commercial application. Regarding oil shale, for example, there is no presently acceptable economical way to extract the hydrocarbon constituents. The desired organic constituent, known as kerogen, constitutes a relatively small percentage of the bulk shale material, so very large volumes of shale need to be heated to elevated temperatures in order to yield relatively small amounts of useful end products. The handling of the large amounts of material is, in itself, a problem, as is the disposal of wastes. Also, substantial energy is needed to heat the shale, and the efficiency of the heating process and the need for relatively uniform and rapid heating have been limiting factors on success. In the case of tar sands, the volume of material to be handled, as compared to the amount of recovered product, is again relatively large, since bitumen typically constitutes only about ten percent of total, by weight. Material handling of tar sands is particularly difficult even under the best of conditions, and the problems of waste disposal are, of course, present here too.

There have been a number of prior proposals set forth for the extraction of useful fuels from oil shales and tar sands in situ but, for various reasons, none has gained commercial acceptance. One category of such techniques utilizes partial combustion of the hydrocarbonaceous deposits, but these techniques have generally suffered one or more of the following disadvantages: lack of precise control of the combustion, environmental pollution resulting from disposing of combustion products, and general inefficiency resulting from undesired combustion of the resource.

Another category of proposed in situ extraction techniques would utilize electrical energy for the heating of the formations. For example, in the U.S. Pat. No. 2,634,961 there is described a technique wherein electrical heating elements are imbedded in pipes and the pipes are then inserted in an array of boreholes in oil shale. The pipes are heated to a relatively high temperature and eventually the heat conduits through the oil shale to achieve a pyrolysis thereof. Since oil shale is not a good conductor of heat, this technique is problematic in that the pipes must be heated to a considerably higher temperature than the temperature required for pyrolysis in order to avoid inordinately long processing times. However, overheating of some of the oil shale is inefficient in that it wastes input electrical energy, and may undesirably carbonize organic matter and decompose the rock matrix, thereby limiting the yield. Further electrical in situ techniques have been termed as "ohmic ground heating" or "electrothermic" processes wherein the electric conductivity of the formations is relied upon to carry an electric current as between electrodes placed in separated boreholes. An example of this type of technique, as applied to tar sands, is described in U.S. Pat. No. 3,848,671. A problem with this technique is that the formations under consideration are generally not sufficiently conductive to facilitate the establishment of efficient uniform heating ourrents. Variations of the electrothermic techniques are known as "electrolinking", "electrocarbonization", and "electrogasification" (see, for example, U.S. Pat. No. 2,795,279). In electrolinking or electrocarbonization, electric heating is again achieved via the inherent conductivity of the fuel bed. The electric current is applied such that a thin narrow fracture path is formed between the electrodes. Along this fracture path, pyrolyzed carbon forms a more highly conducting link between the boreholes in which the electrodes are implanted. Current is then passed through this link to cause electrical heating of the surrounding formations. In the electrogasification process, electrical heating through the formations is performed simultaneously with a blast of air or steam. Generally, the just described techniques are limited in that only relatively narrow filament-like heating paths are formed between the electrodes. Since the formations are usually not particularly good conductors of heat, only non-uniform heating is generally achieved. The process tends to be slow and requires temperatures near the heating link which are substantially higher than the desired pyrolyzing temperatures, with the attendant inefficiencies previously described.

Another approach to in situ processing has been termed "electrofracturing". In one variation of this technique, described in U.S. Pat. No. 3,103,975, conduction through electrodes implanted in the formations is again utilized, the heating being intended, for example, to increase the size of fratures in a mineral bed. In another version, disclosed in U.S. Pat. No. 3,696,866, electricity is used to fracture a shale formation and a thin viscous molten fluid core is formed in the fracture. This core is then forced to flow out to the shale by injecting high pressured gas in one of the well bores in which an electrode is implanted, thereby establishing an open retorting channel.

In general, the above described techniques are limited by the relatively low thermal and electrical conductivity of the bulk formations of interest. While individual conductive paths through the formations can be established, heat does not radiate at useful rates from these paths, and efficient heating of the overall bulk is difficult to achieve.

A further proposed electrical in situ approach would employ a set of arrays of dipole antennas located in a plastic or other dielectric casing in a formation, such as a tar sand formation. A VHF or UHF power source would energize the antennas and cause radiating fields to be emitted therefrom. However, at these frequencies, and considering the electrical properties of the formations, the field intensity drops rapidly as a function of distance away from the antennas. Therefore, once again, non-uniform heating would result in the need for inefficient overheating of portions of the formations in order to obtain at least minimum average heating of the bulk of the formations.

A still further proposed scheme would utilize in situ electrical induction heating of formations. Again, the inherent (although limited) conduction ability of the formations is relied upon. In particular, secondary induction heating currents are induced in the formations by forming an underground toroidal induction coil and passing electrical current through the turns of the coil. The underground toroid is formed by drilling vertical and horizontal boreholes and conductors are threaded through the boreholes to form the turns of the toroid. It has been noted, however, that as the formations are heated and water vapors are removed from it, the formations become more resistive, and greater currents are required to provide the desired heating.

The above described techniques are limited by either or both of the relatively low thermal and electrical conductivity of the bulk formations of interest. Electrical techniques utilized for injecting heat energy into the formations have suffered from limitations given rise to by the relatively low electrical conductivity of the bulk formations. In situ electrical techniques appear well capable of injecting heat energy into the formations along individual conductive paths or around individual electrodes, but this leads to non-uniform heating of the bulk formations. The relatively low thermal conductivity of the formations then comes into play as a limiting factor in attaining a relatively uniformly heated bulk volume. The inefficiencies resulting from non-uniform heating have tended to render existing techniques slow and inefficient.

It is an object of the present invention to provide in situ heat processing of hydrocarbonaceous earth formations utilizing electrical excitation means, in such a manner that substantially uniform heating of a particular bulk volume of the formations is efficiently achieved.

Further objects of the present invention are to provide a system and method for efficiently heat processing relatively large blocks of hydrocarbonaceous earth formations with a minimum of adverse environmental impact and for yielding a high net energy ratio of energy recovered to energy expended.

SUMMARY OF THE INVENTION

Applicants have devised a technique for uniform heating of relatively large blocks of hydrocarbonaceous formations using radio frequency (RF) electrical energy that is substantially confined to the volume to be heated and effects dielectric heating of the formations. An important aspect of applicants' invention relates to the fact that certain hydrocarbonaceous earth formations, for example raw unheated oil shale, exhibit dielectric absorption characteristics in the radio frequency range. As will be described, various practical constraints limit the range of frequencies which are suitable for the RF processing of commercially useful blocks of material in situ. The use of dielectric heating eliminates the reliance on electrical conductivity properties of the formations which characterize most prior art electrical in situ approaches. Also, unlike the proposed schemes which attempt to radiate electrical energy from antennas in uncontrolled fashion, applicants provide field confining structures which maintain most of the input energy in the volume intended to be heated. Conduction currents, which are difficult to establish on a useful uniform basis, are kept to a minimum, and displacement currents dominate and provide the desired substantially uniform heating. Since it is not necessary for the resultant heat to propagate over substantial distances in the formations (as in the above described prior art ohmic heating schemes) the relatively poor thermal conductivity of the formations is not a particular disadvantage in applicants' technique. Indeed, in already-processed formations from which the useful products have been removed, the retained heat which is essentially "stored", can be advantageously utilized. In an embodiment of the invention, initial heating of adjacent blocks of hydrocarbonaceous formations is implemented using this retained heat.

In particular, the present invention is directed to a system and method for in situ heat processing of hydrocarbonaceous earth formations. In accordance with the system of the invention, a plurality of conductive means are inserted in the formations and bound a particular volume of the formations. As used herein, the phrase "bounding a particular volume" is intended to mean that the volume is enclosed on at least two sides thereof. As will become understood, in the most practical implementations of the invention the enclosed sides are enclosed in an electrical sense and the conductors forming a particular side can be an array of spaced conductors. Electrical excitation means are provided for establishing alternating electric fields in the volume. The frequency of the excitation means is selected as a function of the dimensions of the bound volume so as to establish a substantially non-radiating electric field which is substantially confined in said volume. In this manner, volumetric dielectric heating of the formations will occur to effect approximately uniform heating of the volume.

In the preferred embodiment of the invention, the frequency of the excitation is in the radio frequency range and has a frequency between about 1 HMz and 40 MHz. In this embodiment, the conductive means comprise opposing spaced rows of conductors disposed in opposite spaced rows of boreholes in the formations. One particularly advantageous structure in accordance with the invention employs three spaced rows of conductors which form a triplate-type of waveguide structure. The stated excitation may be applied as a voltage, for example across different groups of the conductive means or as a dipole source, or may be applied as a current which excites at least one current loop in the volume. When a triplate-type of structure is employed, the conductors of the central row are preferably substantially shorter than the length of the conductors of the outer rows so as to reduce radiation, and resultant heat loss, at the ends of the conductors.

In accordance with a further feature of the invention, the frequency of the excitation is selected as a function of the electrical lossiness of the formations in the confined volume to be sufficiently low that the (l/e) attenuation distance of the electric field in any direction in the volume is more than twice the physical dimension of the volume in that direction. In this manner, the diminution of the electric field in any direction due to transfer of energy to the formations (as in, of course, desirable to effect the needed heating) is not so severe as to cause undue nonuniformity of heating in the volume and wasteful overheating of portions thereof. As will be described, a further technique is employed for obtaining relatively uniform heating by modifying the electric field pattern during the heating process so as to effectively average the electric field intensity in the volume to enhance the uniformity of heating of the volume.

The electrical heating techniques disclosed herein the applicable to various types of hydrocarbon-containing formations, including oil shale, tar sands, coal, heavy oil, partially depleted petroleum reservoirs, etc. The relatively uniform heating which results from the present techniques, even in formations having relatively low electrical conductivity and relatively low thermal conductivity, provides great flexibility in applying recovery techniques. Accordingly, as will be described, the in situ electrical heating of the present invention can be utilized either alone or in conjunction with other in situ recovery techniques to maximize efficiency for given applications.

Further features and advantages of the invention will become more readily apparent from the following detailed description when taken in conjunction with the accompanying drawings.

DESCRIPTION OF THE PREFERRED EMBODIMENT

Figure 3:
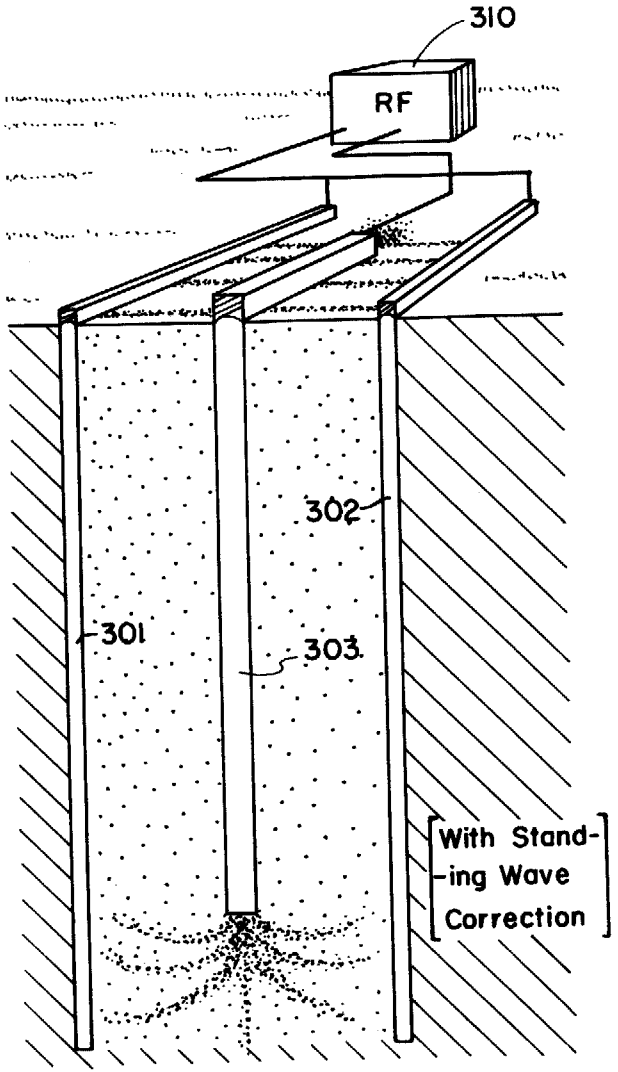
FIG. 3 illustrates an in situ triplate transmission line in earth formations.
Figure 2:
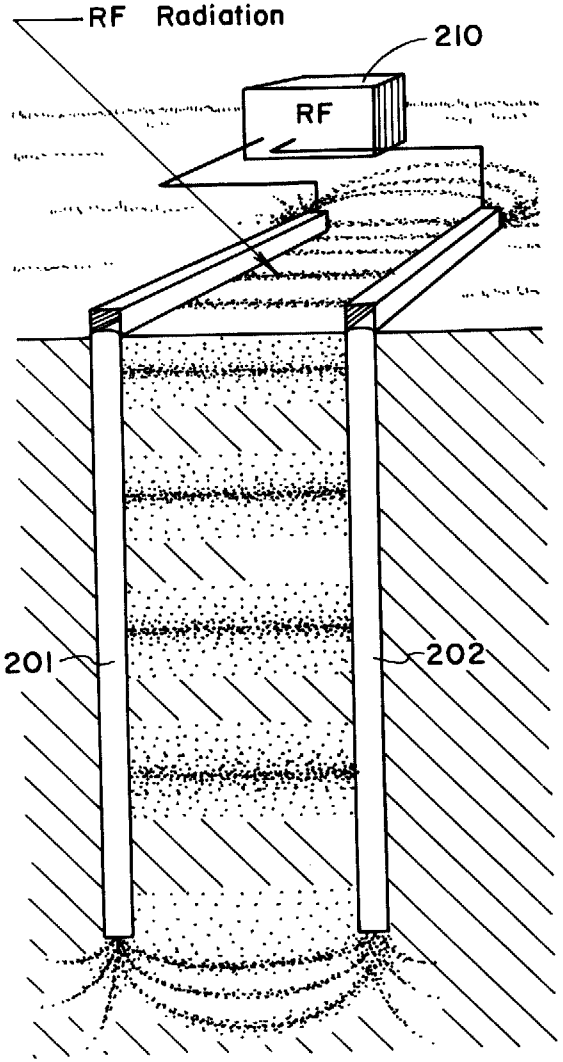
FIG. 2 illustrates an in situ biplate transmission line in earth formations.
Figure 1:
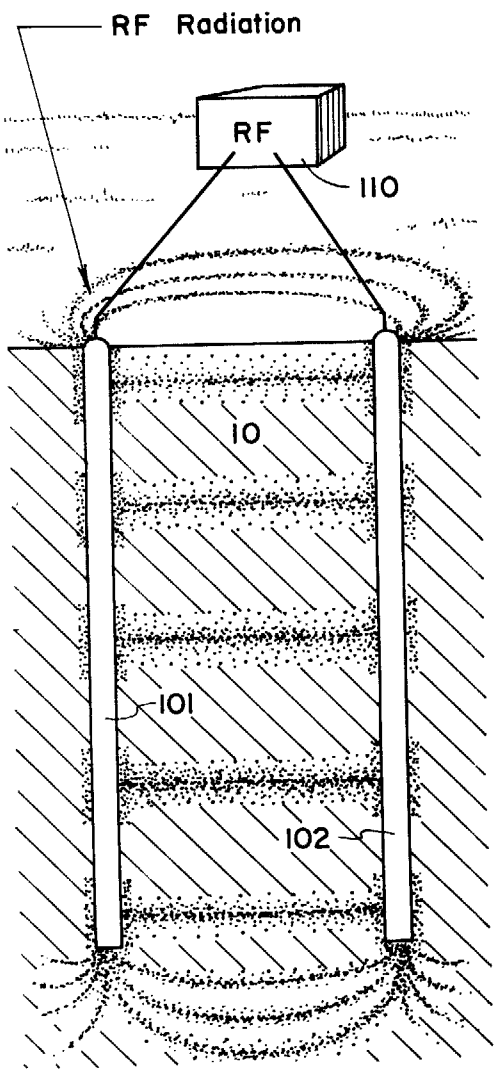
FIG. 1 illustrates an in situ twin lead transmission line in earth formations.

Before describing the preferred implementations of practical forms of the invention, the principles of the invention can be initially understood with the air of the simplified diagrams of FIGS. 1, 2 and 3. FIG. 1 illustrates a twin-lead transmission line defined by a pair of elongated conductors 101 and 102 which are inserted into hydrocarbonaceous earth formations 10, for example an oil shale or coal deposit. A source 110 of radio frequency excitation is coupled to the twin-lead transmission line. The resultant electric field causes heating, the heating being indicated in the FIGURES by the dots. The intensity of the heating is represented by the density of the dots. In FIG. 1, the field lines, which are in a general standing wave pattern, extend well outside the region between the transmission line leads and substantial radiation occurs from various points with resultant loss of heating control. (The actual field pattern will depend, inter alia, upon frequency, as will be discussed below, and the illustrations of FIGS. 1, 2 and 3 are for an appropriately chosen exemplary frequency.) In FIG. 2, there is illustrated a biplate transmission line consisting of spaced parallel conductive plates 201 and 202 in the formations. When excited by a source 210 of RF energy, a standing wave field pattern is again established. Radiation is particularly prevalent at the edges and corners of the transmission line plates. Radiation outside the transmission line confined region is less than in FIG. 1, but still substantial, as is evident from the heating pattern. FIG. 3 illustrates a triplate transmission line which includes spaced outer parallel plate conductors 301 and 302 and a central parallel plate conductor 303 therebetween. Excitation by an RF source 310, as between the central plate and the outer plate, establishes a fairly well confined field. The central plate 303 is made shorter than the outer plates 301 and 302, and this contributes to minimizing of fringing effects. Standing waves would also normally be present (as in FIGS. 1 and 2) but, as will be described further hereinbelow, the periodic heating effects caused by standing wave patterns can be averaged out, such as by varying the effective length of the center plate 303 during different stages of processing. The resultant substantially uniform average heating is illustrated by the dot density in FIG. 3.

It is seen from the FIGS. 2 and 3 that alternating electric fields substantially confined within a particular volume of hydrocarbonaceous formations can effect dielectric heating of the bulk material in the volume. The degree of heating at each elemental volume unit in the bulk will be a function of the dielectric lossiness of the material at the particular frequency utilized as well as a function of the field strength. Thus, an approximately uniform field in the confined volume will give rise to approximately uniform heating within the volume, the heating not being particularly dependent upon conduction currents which are minimal (as compared to displacement currents) in the present techniques.

As previously indicated, the illustrations of FIGS. 1, 2 and 3 are intended for the purpose of aiding in an initial understanding of the invention. The structures of FIGS. 2 and 3, while being within the purview of the invention, are not presently considered as preferred practical embodiments since plate conductors of large size could not be readily inserted in the formations. As will become understood, the confining structures of FIGS. 2 and 3 can be approximated by rows of conductors which are inserted in boreholes drilled in the formations.

Figure 4A:
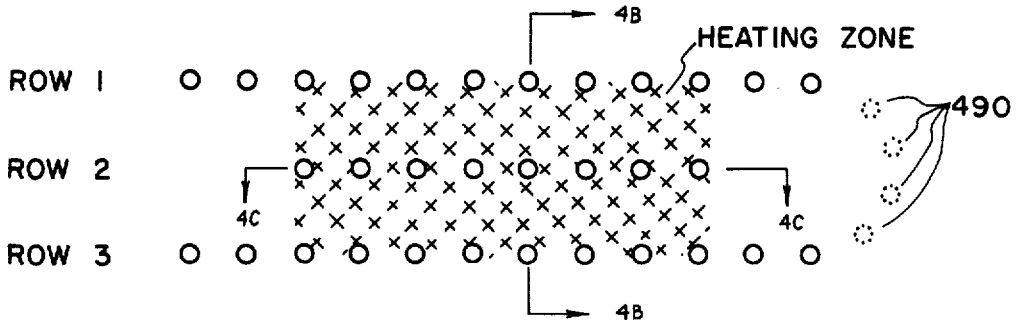
FIG. 4A is a plan view of an in situ structure in accordance with an embodiment of the invention.
Figure 4B:
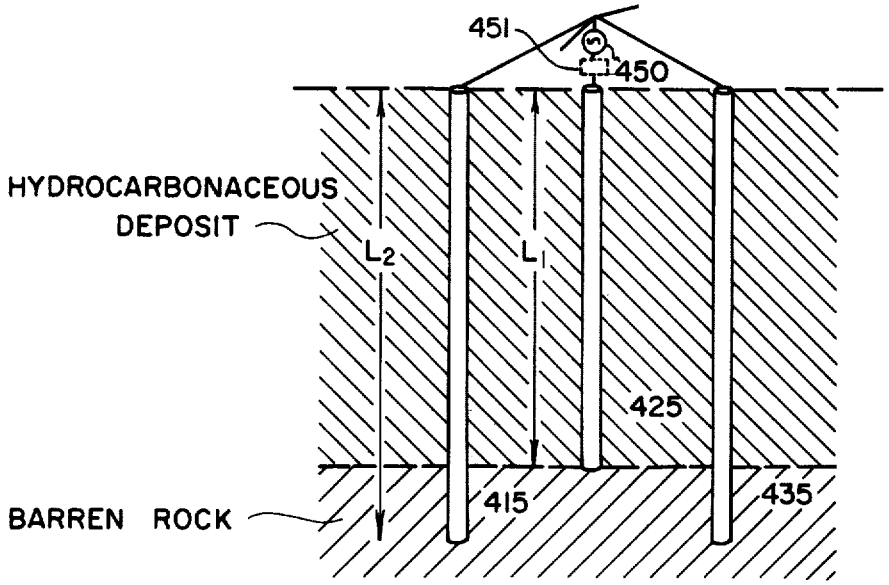
FIG. 4B is an end view of the structure of FIG. 4A as taken through a section defined by arrows 4b—4b of FIG. 4A.
Figure 4C:
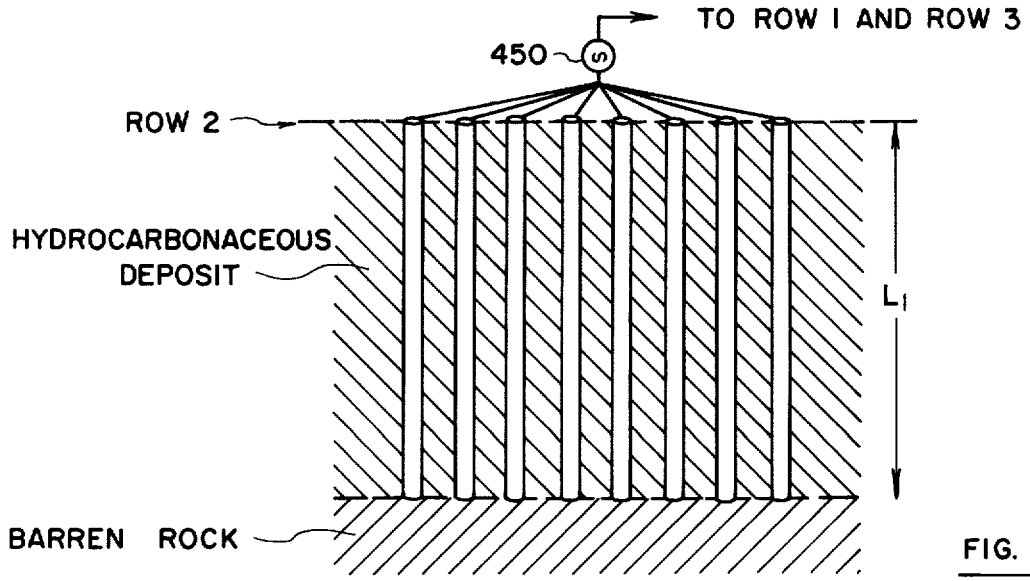
FIG. 4C is a side view of the structure of FIG. 4A as taken through a section defined by arrows 4c—4c of FIG. 4A.

One preferred form of applicants' invented system and method is illustrated in conjunction with FIGS. 4A, 4B and 4C. FIG. 4A shows a plan view of a surface of a hydrocarbonaceous deposit having three rows of boreholes with elongated conductors therein. This structure is seen to be analagous to the one in FIG. 3, except that the solid parallel plate conductors are replaced by individual elongated tubular conductors placed in boreholes that are drilled in relatively closely spaced relationship to form outer rows designated as row 1 and row 3, and a central row designated as row 2. The rows are spaced relatively far apart as compared to the spacing of adjacent conductors of a row. FIG. 4B shows one conductor for each row; viz., conductor 415 from row 1, conductor 425 from row 2, and conductor 435 from row 3. FIG. 4C illustrates the conductors of the central row, row 2. In the embodiment shown, the boreholes of the center row are drilled to a depth of $L_1$ meters into the formations where $L_1$ is the approximate depth of the bottom boundary of the hydrocarbonaceous deposit. The boreholes of the outer rows are drilled to a depth of $L_2$, which is greater than $L_1$ and extends down into the barren rock below the useful deposit. After inserting the conductors into the boreholes, the conductors of row 2 are electrically connected together and coupled to one terminal of an RF voltage source 450 (see FIG. 4B). The conductors of the outer rows are also connected together and coupled to the other terminal of the RF voltage source 450. The zone heated by applied RF energy is approximately illustrated by the cross-hatching of FIG. 4A. The conductors provide an effective confining structure for the alternating electric fields established by the RF excitation. As will become understood, heating below $L_1$ is minimized by selecting the frequency of operation such that a cutoff condition substantially prevents propagation of wave energy below $L_1$.

The use of an array of elongated cylindrical conductors to form a field confining structure is advantageous in that installation of these units in boreholes is more economical than, for example, installation of continuous plane sheets on the boundaries of the volume to be heated in situ. Also, enhanced electric fields in the vicinities of the borehole conductors, through which recovery of the hydrocarbonous fluids ultimately occurs, is actually a benefit (even though it represents a degree of heating non-uniformity in a system where even heating is striven for) since the formations near the borehole conductors will be heated first. This tends to create initial permeability, porosity and minor fracturing which facilitates orderly recovery of fluids as the overall bound volume later rises in temperature. To achieve field confinement, the spacing between adjacent conductors of a row should be less than about a quarter wavelength apart and, preferably, less than about an eighth of a wavelength apart.

Figure 5:
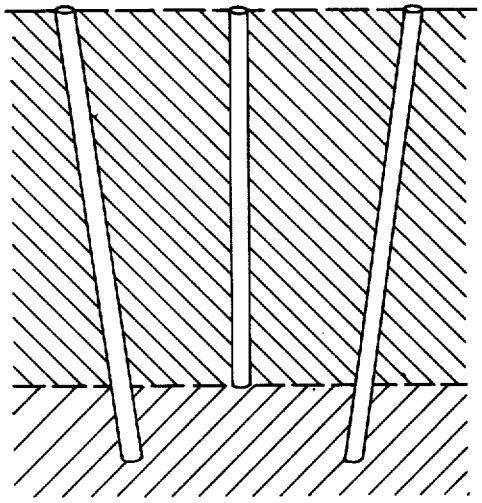
FIG. 5 illustrates an alternate configuration of the structure of FIG. 4B wherein the outer rows of conductors taper toward each other.

Very large volumes of hydrocarbonaceous deposits can be heat processed using the described technique, for example volumes of the order of $10^5$ cubic meters of oil shale. Large blocks can, if desired, be processed in sequence by extending the lengths of the rows of boreholes and conductors. Alternative field confining structures and modes of excitation are possible and will be described further hereinbelow. At present, however, two alternatives will be mentioned. First, further field confinement can be provided by adding conductors in boreholes at the ends of the rows (as illustrated by the dashed boreholes 490 of FIG. 4A) to form a shielding structure. Secondly, consider the configuration of FIG. 5 (analagous to the cross-sectional view of FIG. 4B) wherein the conductors of the outer rows are tapered toward the central rows at their deep ends so as to improve field uniformity (and consequently, heating uniformity) further from the source.

Figure 6:
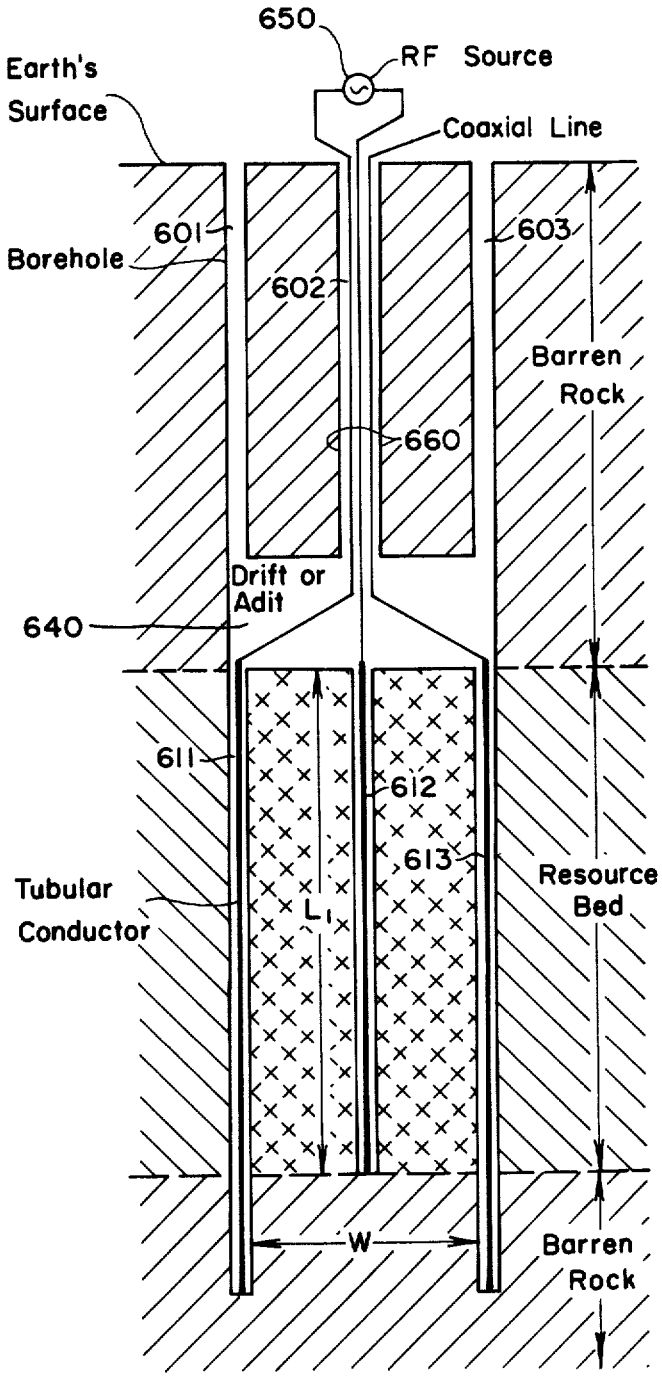
FIG. 6 illustrates implementation of the invention in a situation of a moderately deep resource bed.

In FIGS. 1-5 it was assumed, for ease of illustration, that the hydrocarbonaceous earth formations had a seam at or near the surface of the earth, or that any overburden had been removed. However, it will be understood that the invention is equally applicable to situations where the resource bed is less accessible and, for example, underground mining is required. In FIG. 6 there is shown a situation wherein a moderately deep hydrocarbonaceous bed, such as an oil shale layer of substantial thickness, is located beneath barren rock formations. In such instance, a drift or adit 640 can be mined and boreholes can be drilled from the surface, as represented by the boreholes 601, 602 and 603 of FIG. 6, or from the drift. Again, each of these boreholes represents one of a row of boreholes for a triplate-type configuration as is shown in FIG. 4. After the boreholes have been drilled, tubular conductors 611, 612 and 613 are respectively lowered into the lower borehole portions in the resource bed. The coaxial lines 660 carrying the RF energy from a source 650 to the tubular conductors can now be strung down an upper portion of one or more of the boreholes and then connected across the different rows of tubular conductors at drift 640. In this manner, there is no substantial heating of the upper barren rock as might be the case if the conductors were coupled from the surface of each borehole.

Figure 7:
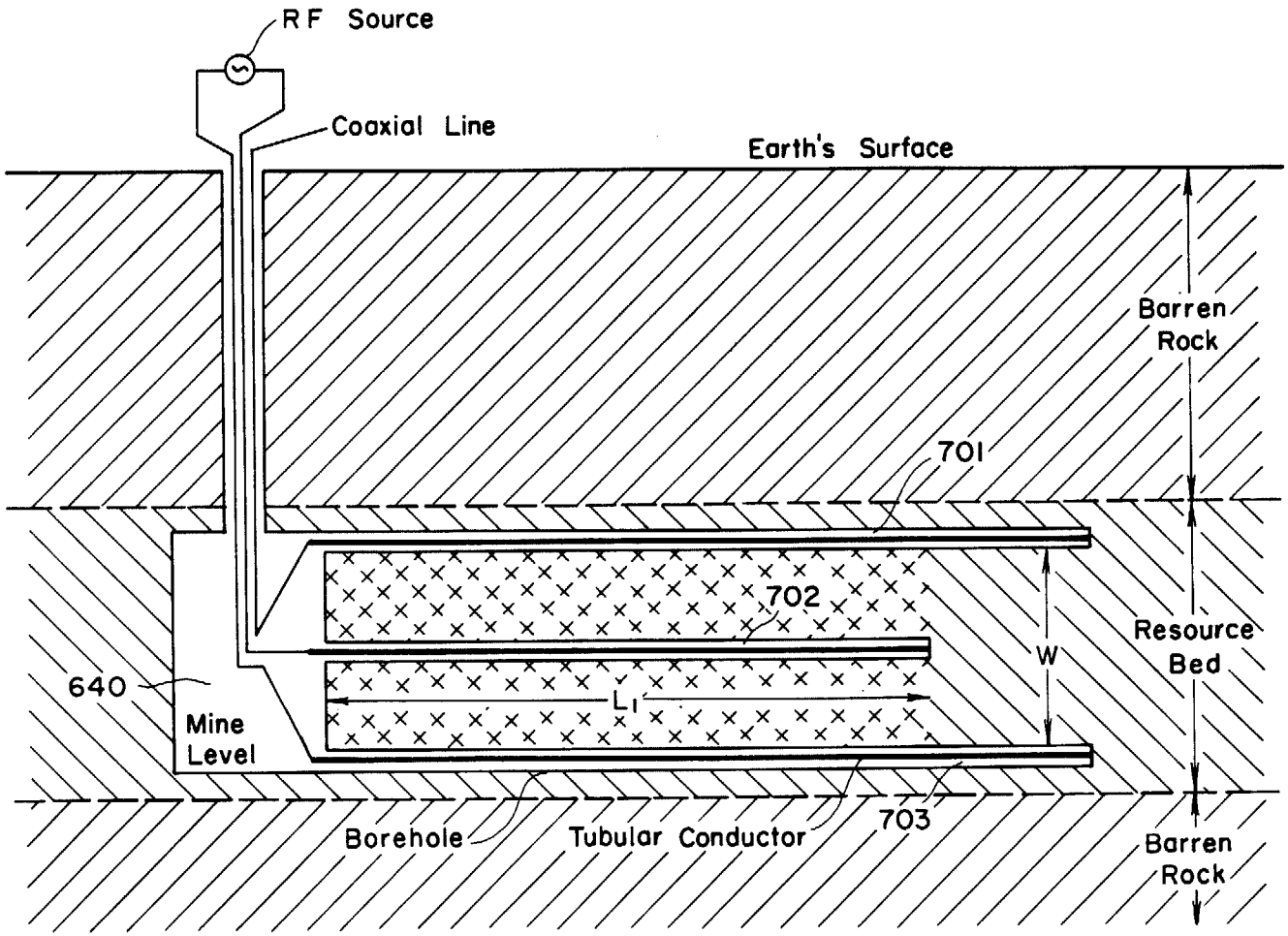
FIG. 7 illustrates implementation of the invention in a situation where a relatively thick resource bed is located relatively deep in the earth's surface.

FIG. 7 illustrates a situation wherein a relatively thin hydrocarbonaceous deposit is located well below the earth's surface. In such case, a drift or adit 640 is first provided, and horizontal boreholes are then drilled for the conductors. The FIG. 7 again illustrates a tri-plate type configuration of three rows of boreholes, with the conductors 701, 702 and 703 being visible in the FIGURE.

The selection of suitable operating frequencies in the present invention depends upon various factors which will now be described. As radio frequency (RF) electromagnetic wave energy propagates within the hydrocarbon-bearing media of interest, electrical energy is continuously converted to heat energy. The two primary energy conversion mechanisms are ohmic heating, which results from the conductivity of the formations, and dielectric heating, which results from rotation of molecular dipoles by the alternating electric field of the wave energy. At any elemental volume point, x, within the formations of interest, the dielectric permittivity at a frequency f can be expressed as $$\epsilon(x,f)=[\epsilon_r'(x,f)-j\epsilon_r''(x,f)\epsilon_o \quad (1)$$

where $\epsilon_r'(x,f)$ is the relative real part of the complex dielectric permittivity, $\epsilon_r''(x,f)$ is the relative imaginary part of the dielectric permittivity and represents both conductivity and dielectric losses and $\epsilon_o$ is the permittivity of free space. The heating power density, U(x,f) at point x can be expressed as $$U(x,f)=\pi f\epsilon_r''(x,f)\epsilon_o E^2(x) \text{ watts/meter}^3 \quad (2)$$

where E(x) is the electric field intensity at the point x. At radio frequencies (0.3 MHz. to 300 MHz.) dielectric heating predominates for the types of formations of interest herein, and the shale, tar sand, and coal deposits to be treated can be considered as "lossy dielectrics".

As the electromagnetic wave energy is converted to heat, the electric field wave progressively decays in exponential fashion as a function of distance along the path of the wave propagation. For each electrical skin depth, Δ, that the wave traverses, there is a reduction in the wave electric field by about 63%. The skin depth, Δ, is related to the propagation medium's permittivity and the electromagnetic wave frequency by the relationship $$\Delta = \frac{(3)\ 10^8\ \epsilon_r'}{\pi f\sqrt{\epsilon_r'\ \cdot \epsilon_r''}} \text{ meters.} \quad (3)$$

The heating resulting from electromagnetic waves in hydrocarbon-bearing formations diminishes progressively as the wave energy penetrates further into the formations and away from the source thereof. Thus, the use of RF energy does not, per se, yield uniform heating of the formations of interest unless particular constraints are applied in the selection of frequency and field confining structure.

An idealized in situ heating technique would elevate all points within the defined heating zone to the desired processing temperature and leave volumes outside the heating zone at their original temperature. This cannot be achieved in practice, but a useful goal is to obtain substantially uniform final heating of the zone, e.g. temperatures which are within a ±10% range throughout.

Since the heating power density, U(x,f), is a function of the square of the electric field intensity, E, it is desirable to have E within the range of about ±5% of a given level in most of the processing zones. Consider, for example, the triplate line structure of FIG. 4 as being imbedded in an oil shale formation. An electromagnetic wave is excited by the RF power source 450 at the surface of the oil shale seam and propagates down the triplate line into the shale. The wave decays exponentially with distance from the surface because of conversion of electrical energy into heat energy. Upon reaching the end of the center conductor, at a depth of $L_1$ meters, it is desired that the wave undergo substantially total reflection. This is achieved by selecting the excitation frequency such that the half wavelength $\lambda_l/2$ along the tri-plate line is substantially greater than the spacing between the outer rows, thereby giving rise to a cutoff condition.

The result of the wave attenuation and reflection is the generation of a standing wave along the length of the triplate line. At a point, x, on the line, the magnitude of the total standing wave electric field, $E_T$—x, from the end of the center conductor is $$E_T(x) = E_T(L_1)\sqrt{\sinh^2\left(\frac{L_1 - x}{\Delta_l}\right) + \cos^2\left[\frac{2\pi(L_1 - x)}{\lambda_1}\right]} \quad (4)$$

where $\Delta_l$ is the electrical skin depth for a wave traveling along the triplate line, and $\lambda_l$ is the wavelength along the triplate line, ($\Delta_l$ and $\lambda_l$ being assumed constant along the length of the line.)

Figure 8:
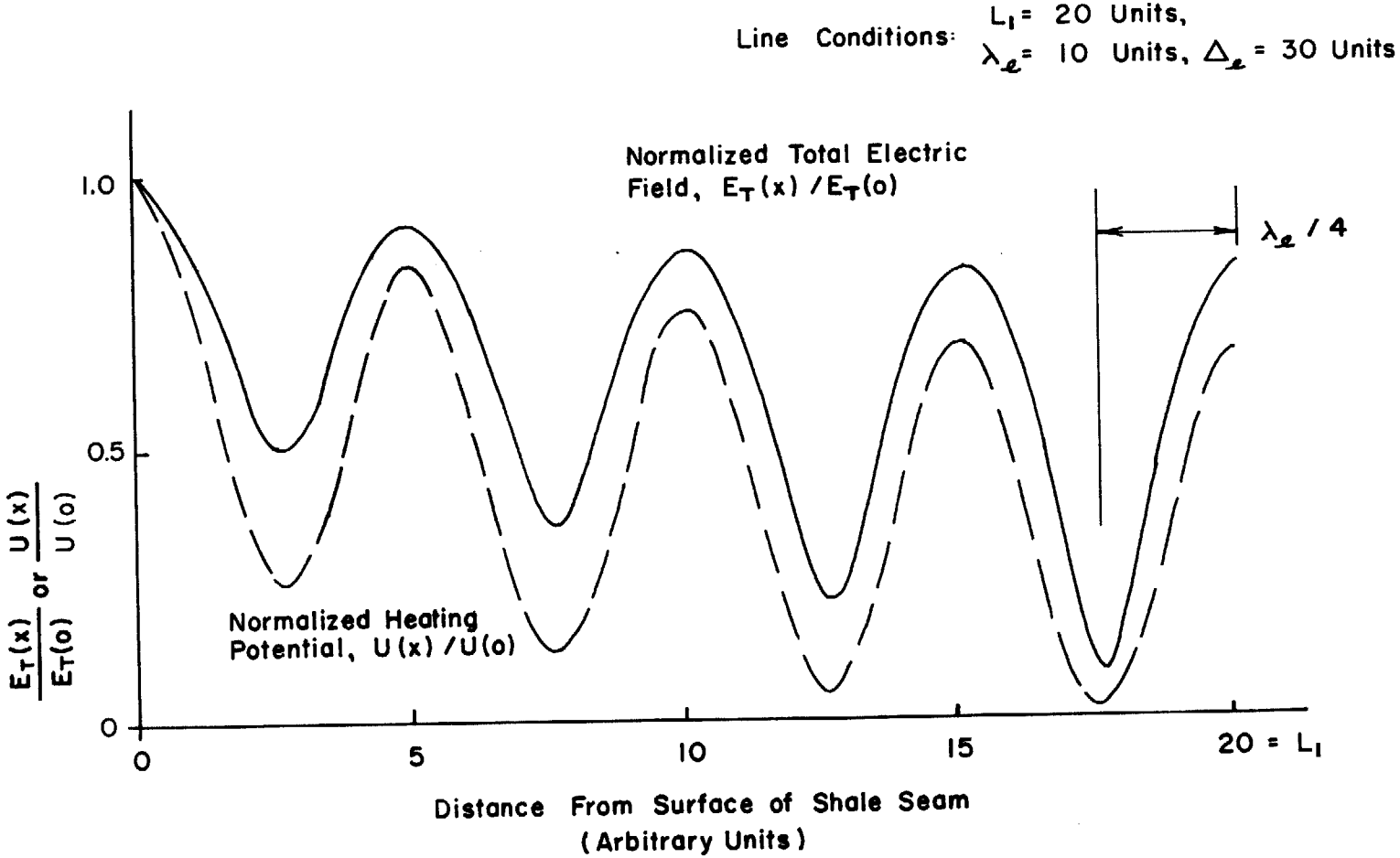
FIG. 8 is a graph of the electric field and heating patterns resulting from a standing wave pattern in a triplate-type live configuration.

To illustrate the nature of the standing wave pattern and heating potential resulting from the triplate-type line of structure of FIG. (4), equation (4) can be used to compute the ratios $E_T(x)/E_T(O)$ and $U(x)/U(O)=[E_T(x)/E_T(O)]^2$ for the triplate line. Typical results are shown in the graph of FIG. 8. It is seen that $E_T$ and U decay with depth and exhibit an oscillatory behavior near $L_1$, with interleaved peaks and nulls separated by a constant distance, $\lambda_l/4$, from each other. The position of the deepest peak coincides with the end of the center conductor at $L_1$; the position of the deepest null is at $L_1-\lambda_l/4$.

Figure 9:
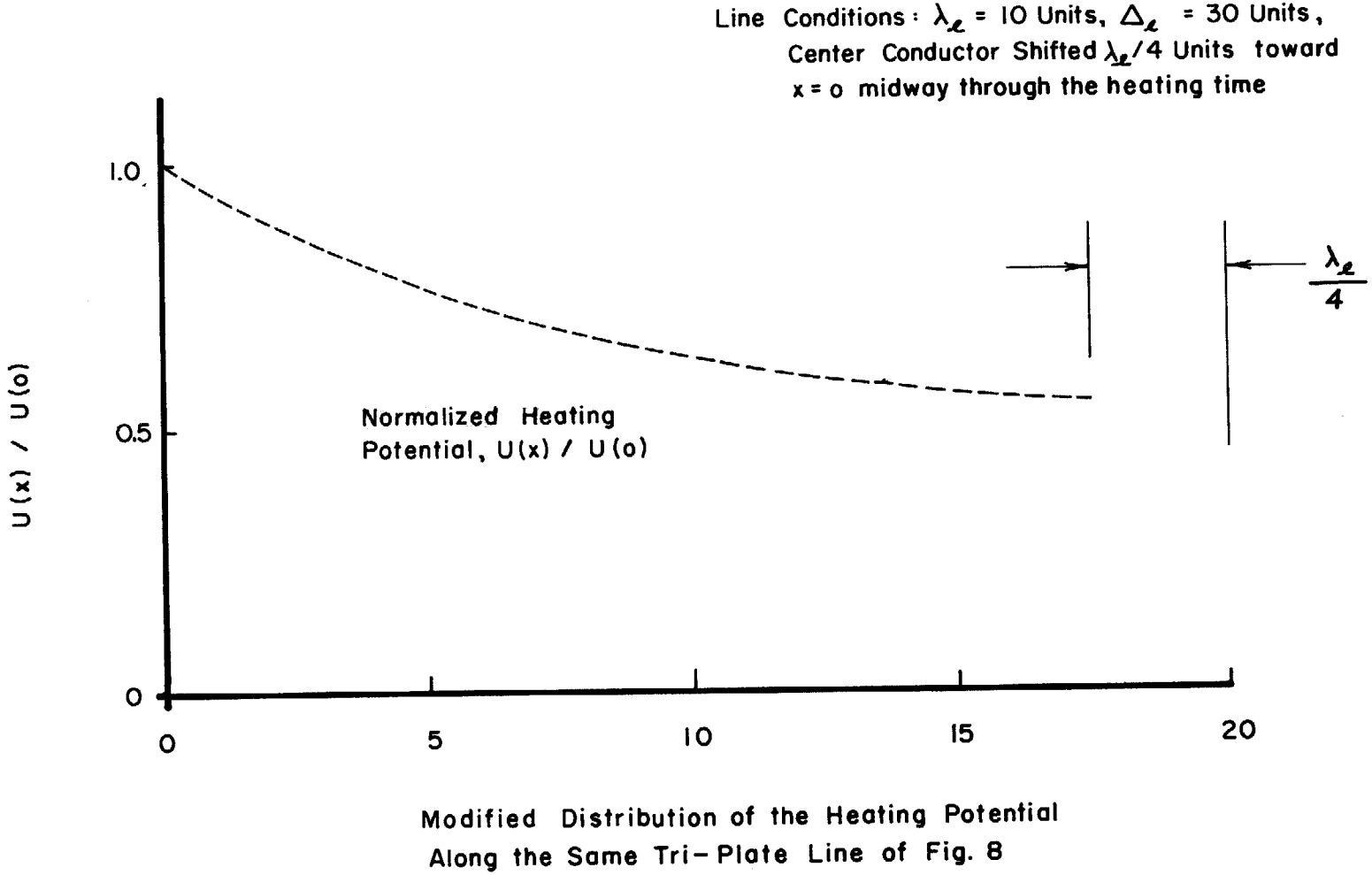
FIG. 9 illustrates a smoothly varying exponential heating pattern which results from modifying of the electric field pattern during operation.

An in situ triplate-type of structure having a heating potential distribution as shown in FIG. 8 will more easily meet heating uniformity goals over its length if the oscillatory pattern could be smoothed out. This can be done by modifying the electric field pattern so as to effectively average the electric field intensity in the volume being heated. This may be achieved by physically decreasing the insertion depth of the center conductor by $\lambda_l/4$ units midway through the heating time. Pulling each tube of the center conductor $\lambda_l/4$ units out of its respective borehole, or employing small explosive charges to sever the deepest $\lambda_l/4$ units of each tube are two ways this can be done. Shifting the end of the center conductor in this manner would shift the entire standing wave pattern toward the surface of the oil shale seam by a distance of $\lambda_l/4$ units. Thus, heating peaks would be moved to the positions of former heating nulls, and vice versa. Averaged over the entire heating time, the spatially oscillatory behavior of U would largely disappear. This can be demonstrated mathematically using equations (2) and (3):

$$U(xf)_{overall} = U(xf)_{\substack{before\ center \\ conductor\ shift}} + U(xf)_{\substack{after\ center \\ conductor\ shift}} \tag{5}$$

$$= K\pi f\epsilon''(xf) \cdot \left\{ \sinh^2\left(\frac{L_1 - x}{\Delta_l}\right) + \cos^2\left[\frac{2\pi(L_1 - x)}{\lambda_1}\right] + \sinh^2\left(\frac{L_1 - x - \frac{\lambda_l}{4}}{\Delta_l}\right) + \cos^2\left[\frac{2\pi\left(L_1 - x - \frac{\lambda_l}{4}\right)}{\lambda_l}\right] \right\}$$

$$= K\pi f\epsilon''(xf) \cdot \left[1 + \sinh^2\left(\frac{L_1 - x}{\Delta_l}\right) + \sinh^2\left(\frac{L_1 - x - \frac{\lambda_l}{4}}{\Delta_l}\right)\right]$$

where K is a constant set by the power level of the source. Equation (5) represents a smoothly varying exponentially decreasing distribution of U, as shown in FIG. 9. It will be understood that electrical means could alternatively be utilized to modify the electric field pattern so as to average the electric field intensity in the volume being heated. Modification of the phase or frequency of the excitation could also be employed.

The described technique of effectively averaging the electric field substantially eliminates peaking-type heating non-uniformities, but it is seen that the exponential decay of the electric field still poses difficulties in attaining substantially uniform heating. In order to minimize the latter type of heating non-uniformity, the frequency of operation is selected such that the (l/e) attenuation distance $\Delta_l$ is greater than the length $L_1$ and, preferably, greater than twice the length $L_1$.

The value of $\Delta_l$ which is allowable for a particular heating uniformity criterion can be determined from equation (5) by setting the heating potential at $x = L_1 - \lambda_l/4$ (the final position of the end of the center conductor) to be a desired percentage of the heating potential at $x=0$. For example, a heating goal of $\pm 10\%$ in the volume would indicate that the desired percentage is 80%, so we have:

$$1 + \sinh^2\left(\frac{\lambda_l/4}{\Delta_l}\right) = 0.8\left[1 + \sinh^2\left(\frac{L_1}{\Delta_l}\right) + \sinh^2\left(\frac{L_1 - \frac{\lambda_l}{4}}{\Delta_l}\right)\right] \tag{6}$$

assuming the $\epsilon''(L_1 - \lambda_l/4) = \epsilon''(0)$. For the present situation, the following inequalities hold true:

$$\lambda_l/4 << \Delta_l, \lambda_l/4 << L_1. \tag{7}$$

Using these inequalities, equation (6) can be rewritten as:

$$1 \approx 0.8\left[1 + 2\sinh^2\left(\frac{L_1}{\Delta_l}\right)\right] \tag{8}$$

or equivalently as:

$$\sinh^2(L_1/\Delta_l) \approx 0.125, \tag{9}$$

which has the solution $$L_1 = L_{1max} \approx 0.35\ \Delta_l. \tag{10}$$

Thus, the length of the center conductor row of the triplate-type line should not exceed 35% of the line (l/e) attenuation distance in order to insure heating uniformity within $\pm 10\%$ over the length of the line. Stated another way, to meet this heating uniformity requirement the frequency of excitation should be sufficiently low to insure a skin depth of about three times $L_1$.

For an in situ triplate line type of structure (e.g. FIG. 4) with no artificial loading by either lumped capacitances or inductances, the expression for $\Delta$ is given by (3) above, and combining (3) and (10) gives:

$$L_{1max}(f) \approx \frac{10^8}{\pi f\sqrt{\epsilon_r'(f)}} \cdot \frac{\epsilon_r'(f)}{\epsilon_r''(f)} \text{ meters.} \tag{11}$$

Figure 10:
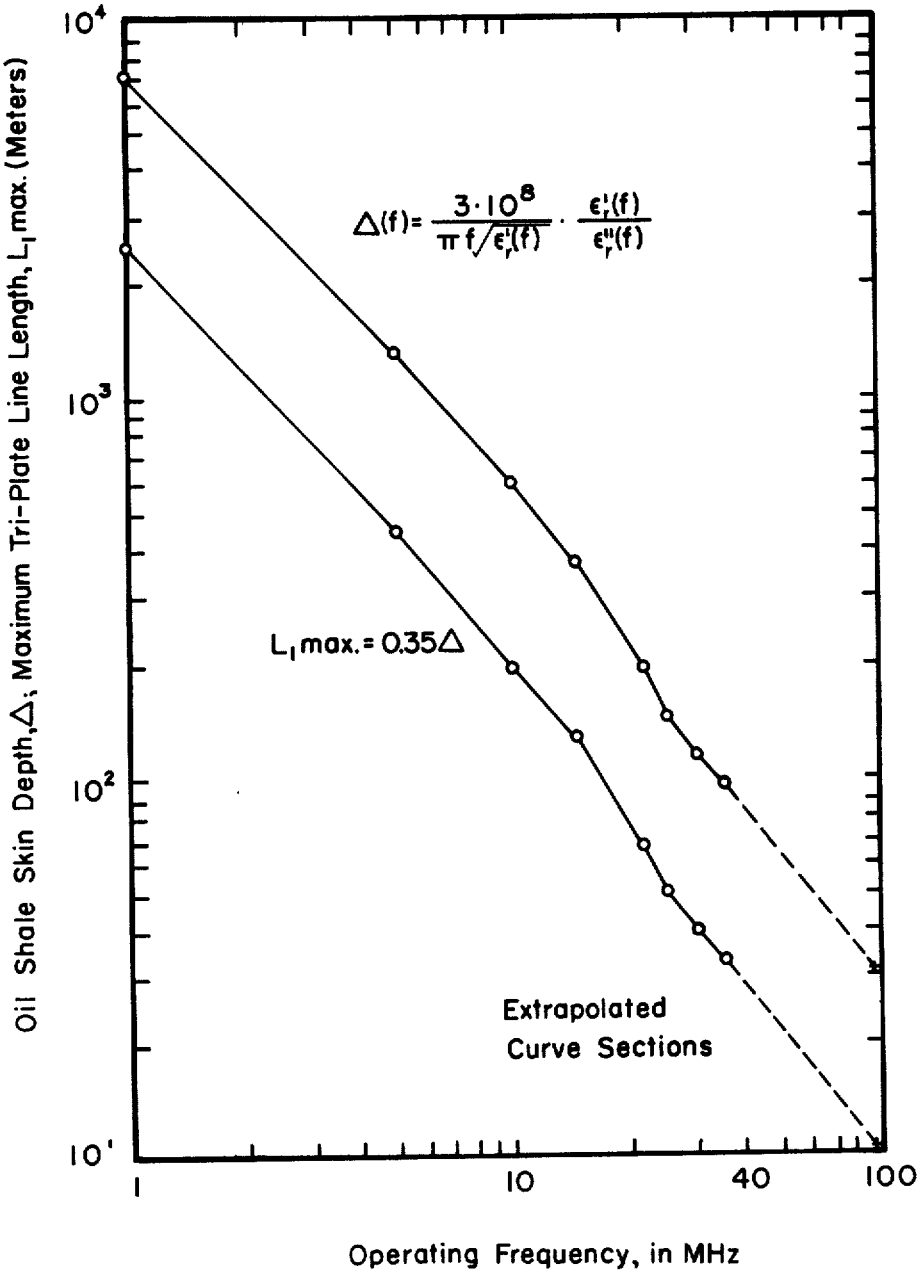
FIG. 10 is a graph of operating frequency versus skin depth for an in situ oil shale heating system.

To determine the variation of $L_{1max}$ with frequency for oil shale, laboratory tests were conducted to obtain the electrical permittivity of dry, Mahogany-type, Colorado oil shale over the frequency range of 1 MHz to 40 MHz. Using the data in conjunction with equations (3) and (11) curves for $\Delta$ and $L_{1max}$ were plotted versus frequency, as shown in FIG. 10. It is seen, for example, that to allow the use of a single triplate-type structure to process in situ a complete top to bottom section of an oil shale bed with a thickness of 100 meters, the maximum operating frequency which meets the stated heating uniformity criterion would be 18 MHz. In a similar manner, FIG. 9 can be used to determine the maximum operating frequency for triplate-type structures used to heat process shale beds ranging in thickness from 10 meters ($f_{max}$=95 MHz) to 2500 meters ($f_{max}$=1 MHz). It will be understood that trade-offs as between line length and frequency can be effected when, for example, it is desirable to select a particular frequency to comply with government radio frequency interference requirements.

Capacitive loading could also be employed to minimize amplitude reduction effects. For example, series capacitors can be inserted at regular intervals along the tubes of the center conductor of the triplate line. These capacitors would act to partially cancel the effective series inductance of the center conductor. Using the expression for $\Delta_l$ of an arbitrary lossy transmission line, it can be shown that $$\Delta_l = \frac{\Delta}{\sqrt{1 - \frac{r}{100}}} \tag{12}$$

for an in situ triplate-type line, where $\Delta$ is the nominal (l/e) attenuation distance at the operating frequency, and r is the percentage reduction of the center conductor inductance caused by the inserted capacitors. For example, if the effective center conductor inductance were reduced by 75%, $\Delta_l$ would increase by 100% to a value of $2\Delta$.

Having set forth considerations which are used in determining maximum operating frequency, attention is now turned to the selection of suitable minimum operating frequency.

The rate of resource heating is controlled by U(x,f), the heating power density generated by the electromagnetic field. As seen from relationship (2), there are two types of factors influencing the rate of heating: a frequency-independent amplitude factor, $E^2(x)$; and a frequency-dependent factor, $f\epsilon''$ (x,f). To achieve rapid heating of the resource body, it would be desirable to generate a large value of E. However, if E is increased beyond some maximum value, designated $E_{max}$, the RF electric field could cause arc-over or breakdown of the rock matrix and carbonized, conducting paths might form between the inner and outer conductors of the in situ confining structure. This could lead to undesirable short circuiting of the system. To avoid this possibility, the average RF electric field within the structure is constrained to be no more than $(S)E_{max}$, where S is a dimensionless safety factor in the range 0.01–0.1. In this way, reliable operation is insured despite electric field enhancement at the surfaces of the conducting tubes of the FIG. 4 structure and possible local variations of the breakdown level of the resource. A pilot or demonstration scale RF in situ facility could operate with a typical S factor close to 0.1 so that simulated production runs could be completed rapidly. However, a large scale, commercial facility would likely be designated more conservatively, i.e., with an S factor close to 0.01, to assure normal operation of an associated high power RF generator under "worst case" conditions. Using $E_{avg.}=SE_{max}$ in relationship (2) yields $$U_{average}(f) \leqq S^2 \cdot [\pi f \epsilon_r''(f) \epsilon_o E^2_{max}] W/m^3 \quad (13)$$

The RF heating power density varies as the square of S, so selection of S has an important impact on the processing time and, as will be seen, selection of minimum operating frequency. It is seen from relationships (2) and (13) that increasing the product term, $f\epsilon_r''(x,f)$, increases the electromagnetic heating power density regardless of the electric field amplitude. This product term is found to increase monotonically in the frequency range of 1 MHz to 40 MHz for oil shale. Thus, for a given RF electric field, increasing the operating frequency causes the shale heating rate to increase. Considerations of maximum operating frequency, set forth above, must be borne in mind, however.

The minimum processing time at a particular operating frequency, $t_{min}$ (f), can be derived as a function of the fraction, R, of spent shale sensible heat that can be recycled (this aspect to be treated below), the RF electric field breakdown level, $E_{max}$, of the shale rock, the safety factor, S, and the loss component, $\epsilon_r''$ (f), of the shale. First, the total RF heating energy required to process one cubic meter of raw oil shale can be calculated, assuming an oil shale density of 1.6 g/cm$^3$ ($1.6 \cdot 10^3$ kg/m$^3$) and assuming $$\text{RF heating requirement} = \frac{(5.6 - R \cdot 3.0) \cdot 10^6 \text{ J}}{7.4 \text{ kg shale}} \cdot 1.6 \cdot 10^3 \frac{\text{kg}}{\text{m}^3} = (1.2 - R \cdot 0.65) \cdot 10^9 \text{ J/m}^3 \quad (14a)$$

Now, $t_{min}$ (f) can be found by dividing the RF heating requirement of Equation (14a) by the maximum RF heating power density of Equation (13):

$$t_{min}(f) = \frac{(1.2 - R \cdot 0.65) \cdot 10^9 \text{ J/m}^3}{S^2 \cdot \pi f \epsilon_r''(f) \epsilon_o E^2_{max} \text{ W/m}^3} \quad (14b)$$

-continued $$= \frac{(4.3 - R \cdot 2.3) \cdot 10^{19}}{S^2 f \epsilon_r''(f) E^2_{max}} \text{ sec.}$$

Figure 11:
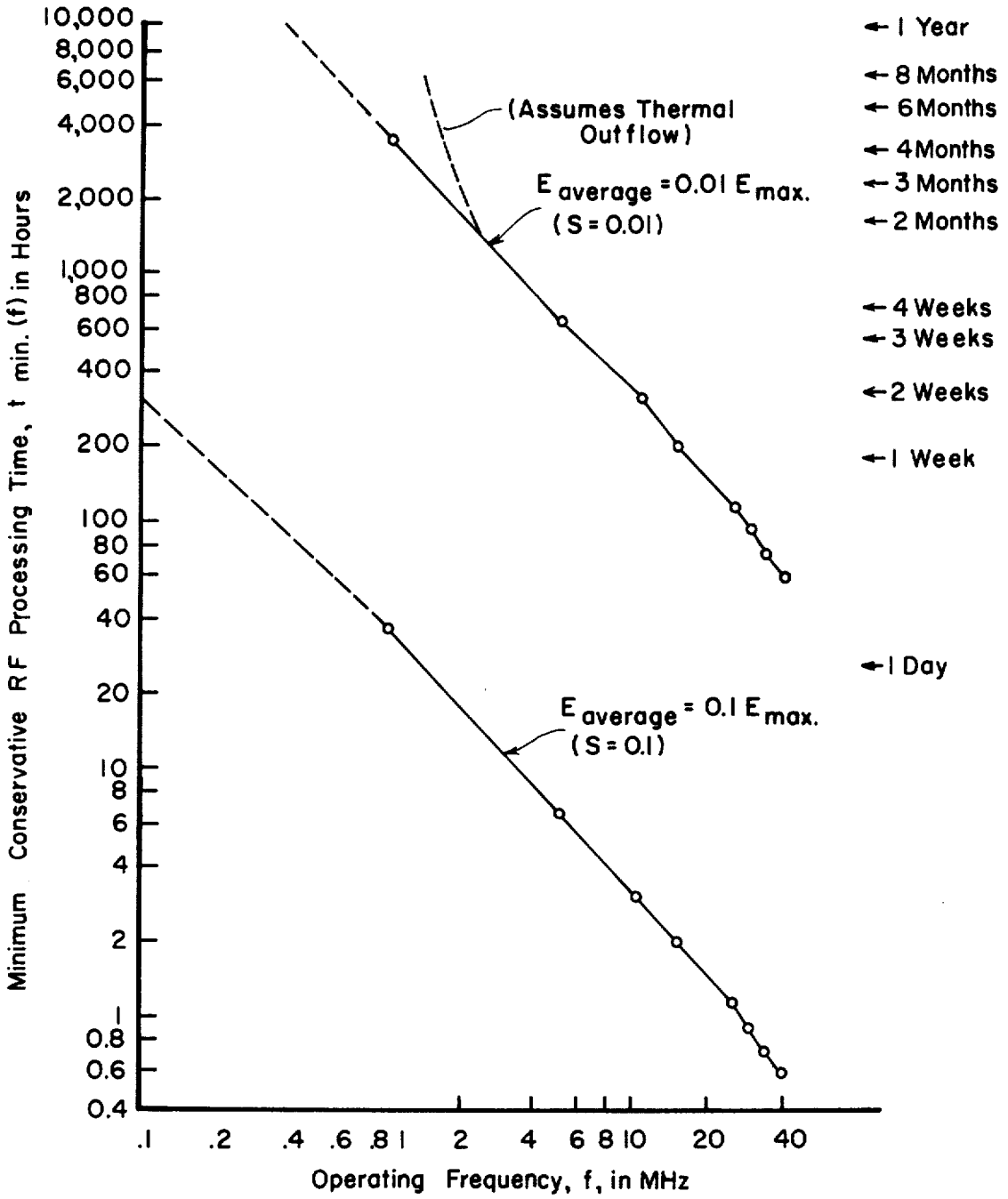
FIG. 11 is a graph of operating frequency versus processing time for an in situ oil shale heating system.

FIG. 11 uses Equation (14b) to plot versus frequency the minimum processing time (with S=0.01 and S=0.1) for RF heating of dry, Mahogany-type Colorado oil shale. It is assumed that $E_{max}=10^6$ V/m and is independent of the operating frequency, and the R=0.5. From FIG. 11, it is seen that, for S=0.1, $t_{min}$ ranges from 0.6 hours at 40 MHz to 36 hours at 1 MHz, and to an extrapolated time of about 300 hours at 0.1 MHz. For S=0.01 $t_{min}$ ranges from 60 hours at 40 MHz to 3600 hours (5 months) at 1 MHz.

During the processing cycle of a block of shale using the present technique, heat conduction to adjacent shale regions can tend to degrade the desired heating uniformity by causing cooling of the boundary planes of the shale block being processed. Further, such thermal conduction results in heat energy flowing outside the block of interest, complicating the problem of controlling the extent and efficiency of the heating process. Such an outflow of heat further increases the necessary heating time. Actual determination of heat flow effects is a complex function of the size and shape of the shale blocks being heated; however, an illustration of such effects on the graphs of FIG. 11 is depicted by the dotted lines curves for a hypothetical block of shale.

In order to limit these undesired consequences of resource heat conduction, it is desirable to complete the processing cycle of the block being treated before appreciable heat energy can flow out of the block. Based on these considerations, applicants have selected a maximum electrical processing time of about two weeks, with preferred processing times being less than this time. From FIG. 11, this condition would mean that the operating frequency could be no lower than 0.1 MHz for the S=0.1 case, and could be no lower than 10 MHz for the S=0.01 case. An intermediate value of S would accordingly yield an intermediate "order of magnitude" frequency of 1 MHz. The frequency lower bound (based on considerations of heat conduction away from the electrically heated zone and conservative design relative to shale breakdown) can be combined with the frequency upper bound obtainable from FIG. 10 (based on considerations of heating uniformity within the zone and shale skin depth) to define the preferred frequency range. For blocks of commercially practical size, a maximum frequency of about 40 MHz is preferred, so that preferred frequency range is about 1 MHz to 40 MHz. It should be noted that other confining structures within the purview of the invention, such as waveguides and cavities, will have somewhat different optimum operating frequency ranges because of differences in the electromagnetic field patterns and heat conduction times peculiar to a given geometry.

Figure 12A:
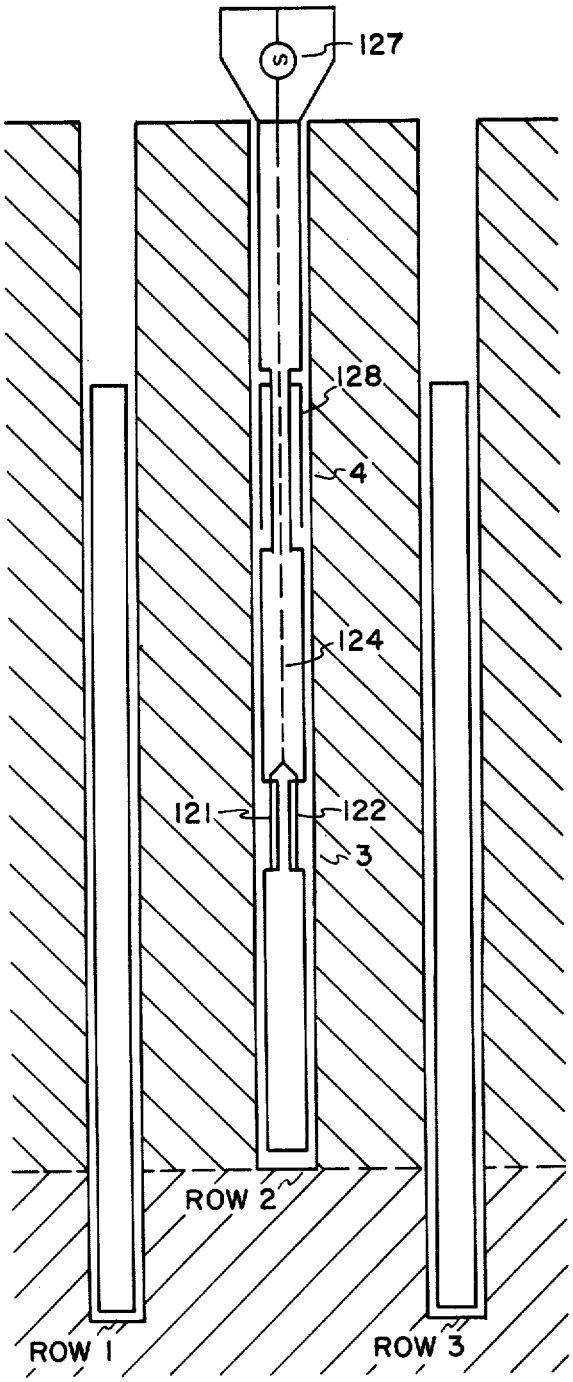
FIG. 12A illustrates an embodiment of the invention wherein current loop excitation is employed.
Figure 12B:
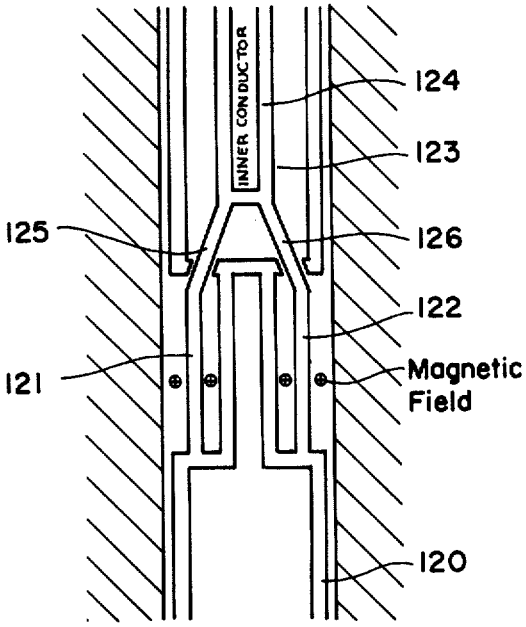
FIG. 12B is an enlargement of a portion of FIG. 12A.

It will be understood that there are other possible techniques for exciting the alternating electric field patterns to obtain dielectric heating of the formations bound by the confining conductor structures of the invention: i.e., alternative to the previously described technique of applying voltages across different groups of the conductors. In FIG. 12 there is again shown a triplate-type of configuration having rows of conductors designated as row 1, row 2 and row 3, the conductors again being inserted in boreholes drilled into hydrocarbonaceous formations such as an oil shale bed. In the embodiment of FIG. 12, the desired field pattern in the confined volume of formations is established using a current loop excitation.

The conductors of the central row have loop exciters 121 and 122 formed integrally therewith, the loop exciters 121 providing magnetic field excitation to the left of the central row conductors and the loop exciters 122 providing magnetic field excitation to the right of the central row conductors. The established alternating electric field pattern, concomitant with the varying magnetic field, provides substantially uniform dielectric heating in the manner previously described. The conductors of the central row have an outer tubular metal shell 123 and an inner conductor 124, shown in dashed line in FIG. 4A. Slots 125 and 126 are formed in the outer tube and the loops 121 and 122 extend from the inner conductor, through the slots, and then reconnect with the outer conductor as shown by the dashed line. The lower portion 120 of the central row conductor extends from the bottom of the loop.

In operation, an RF current source 127 is coupled between the outer tubular conductor 123 and the inner conductor 124 and drives current through the loop 121 and 122, thereby establishing alternating magnetic fields and concomitant electric fields which are confined in the volume bound by the rows of conductors in row 1 and row 3. A quarter wave stub 128 is provided at about the top of the hydrocarbonaceous deposit and, in effect, creates an open circuit which isolates the conductor passing through the overburden from the lower portion thereof. This technique prevents energy from propagating back toward the source and heating the overburden. Considerations of frequency are similar to those discussed above. An advantage of the approach of FIG. 12 is that the voltage carrying capability of the cables can be reduced since the possibility of a voltage breakdown is diminished when using a current drive scheme.

Figure 16:
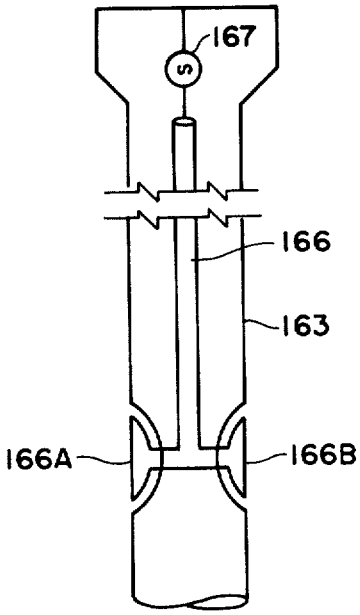
FIG. 16 illustrates an embodiment of the invention wherein electric dipole excitation is employed.

It will be understood that various alternate techniques for excitation of the electric fields can be implemented to obtain dielectric heating as defined herein. For example, electric dipole excitation could be employed to generate the electric fields in the confined volume, so long as the previously described frequency limitations are met for establishing relatively uniform dielectric heating. FIG. 16 illustrates an arrangement wherein electric dipole excitation is used. Center conductor 166 is coupled to electrodes 166A and 166B which protrude from slots in outer conductor 163, and a voltage source 167 is coupled between the inner and outer conductors.

In the configuration of FIG. 12, wherein a current loop drive is utilized, it is advantageous to use a source position which results in an odd number of quarter wavelengths from the position of the current loop to each end of the central conductor, since the source is at a voltage minimum and it is desirable to have voltage maxima at the open circuited terminations to achieve a resonance condition. Similarly, in FIG. 16 the dipole source is preferably located an even number of quarter wavelengths from the ends of the central conductor.

Figure 13:
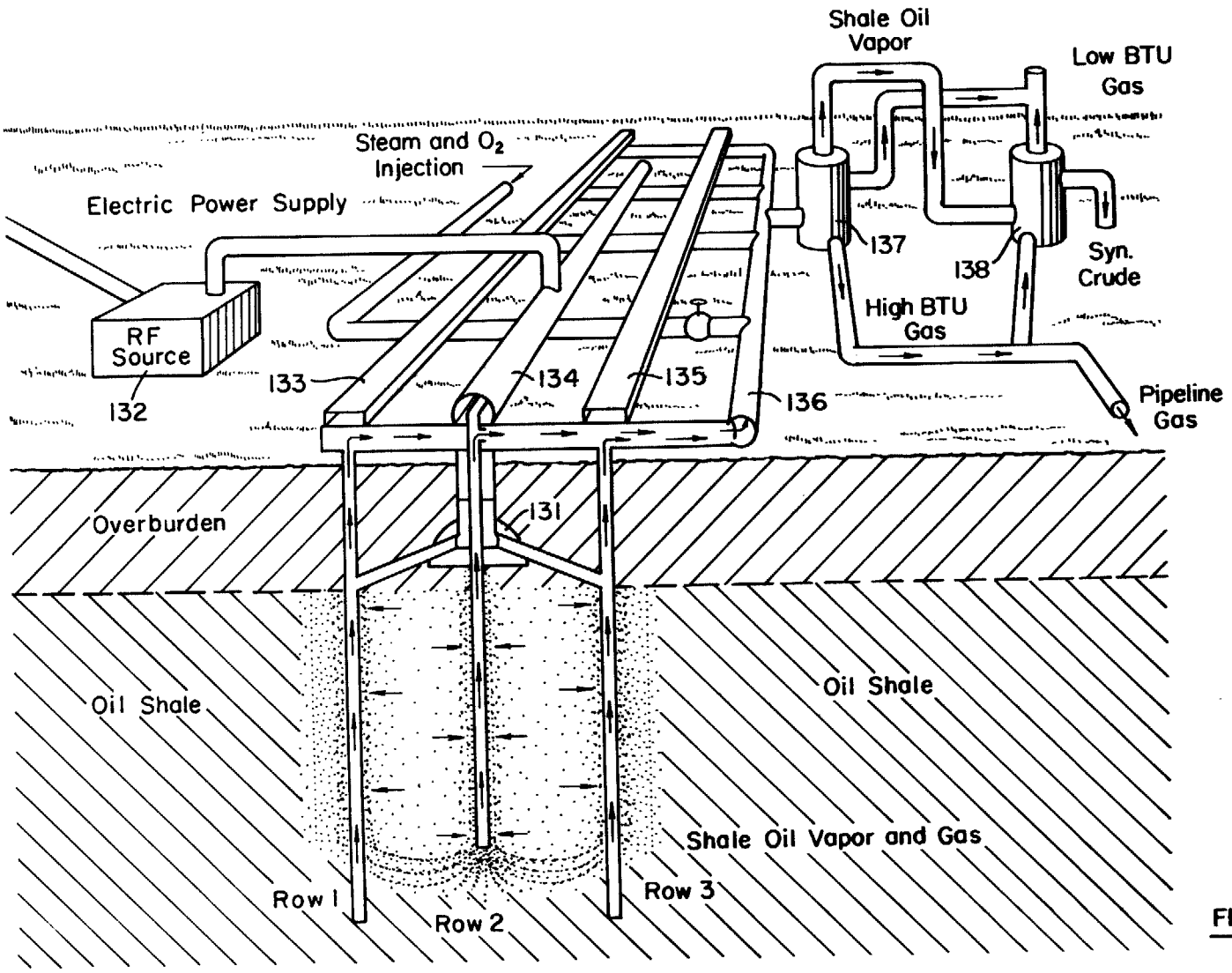
FIG. 13 is a simplified schematic diagram of a system and facility for recovery of shale oil and related products from an oil shale bed.

Referring to FIG. 13, there is shown a simplified schematic diagram of a system and facility for recovery of shale oil and related products from an oil shale bed. A tri-plate-type configuration of the nature previously described is used in this system. Three rows of boreholes, designated as row 1, row 2 and row 3, are drilled through the overburden and into the oil shale bed, the central row of boreholes preferably being of a lesser depth than the outer rows. A drift 131 is mined in the overburden above the oil shale formation so that electrical connections can be made in the manner described in conjunction with FIG. 6. Tubular conductors are inserted into the lower portions of the boreholes of each row. An RF source 132 is provided and obtains its power from a suitable power plant which may or may not be located at the site. For ease of illustration, the electrical connections are not shown in FIG. 13, but they may be the same as those of FIG. 6. A network of pipes for injection of suitable media are provided, the horizontal feed pipes 133, 134 and 135 being coupled to the boreholes of row 1, row 2 and row 3, respectively, and suitable valves and cross-couplings also being provided. The art of injecting suitable media and recovering subsurface fluids is well developed and not, taken alone, the subject of this invention, so the description thereof is limited to that necessary for an understanding of the present system and techniques. Recovered fluids are coupled to a main discharge pipe 136 and then to suitable processing plant equipment which is also well known in the art. Again, these well known techniques will not be described in full detail herein, but a conduit 137 represents the process of separation of shale oil vapor and high and low BTU gas, whereas the conduit 138 represents the processing of shale oil vapor, in well known manner, to obtain synthethic crude. The overall processing system of FIG. 13 will vary somewhat in its structure and use, depending upon which of the to-be-described versions of the present technique are utilized to recover valuable constituents from the oil shale bed.

It will be recognized that the heating can be advantageously performed to different degrees in order to implement useful extraction of the organic resources from the formations. These techniques will also vary with the type of resource form which the fuel is being recovered. In the case of oil shale, three versions of extraction techniques utilizing the invention are set forth, although it will become clear that variations or combinations of these techniques could be readily employed by those skilled in the art. The first version aims only for recovery of shale oil and by-product gases that correspond to the recovery aims of previously proposed in situ oil shale processing techniques. Electrical radio frequency energy is applied, for example using the system of FIG. 13, to heat a relatively large block of oil shale in situ to above 500° C. As the temperature passes the point where inherent shale moisture flashes into steam, some fracturing, at least along bedding planes, will typically be experienced. Additional interconnecting voids will also form within unfractured pieces of oil shale during pyrolysis in the 400°–500° C. range. While substantially uniform heating is striven for, heating is not exactly uniform and the oil shale nearer the electrodes will be heating slightly more rapidly than the shale further away. As a result, permeability is progressively established outward from the electrodes, permitting passage of shale oil vapors up the hollow electrode tubes for collection. In the same way, the considerable quantity of hydrocarbon gases liberated at shale temperatures between about 200° C. to 500° C. will pass to the surface via the tubes. At the surface of the earth, the shale oil vapors and bi-product gases are collected and processed using known techniques, as depicted broadly in FIG. 13. In this first version there is not necessarily any attempt to utilize the carbonaceous residue left in the spent shale formations.

Another in situ processing version which utilizes the electrical radio frequency heating techniques of the invention would aim to increase the yield of useful products from the oil shale resource and to reduce process energy consumption by making full use of the unique attributes of the disclosed in situ heating technique. Since heating to relatively precise temperatures is possible with the invented technique, this second version would apply heating to about 425° C. to recover cracked kerogen in liquid form. In this manner, the substantial electric energy needed to apply the additional heat to volatilize the shale oil product would be saved.

Figure 15:
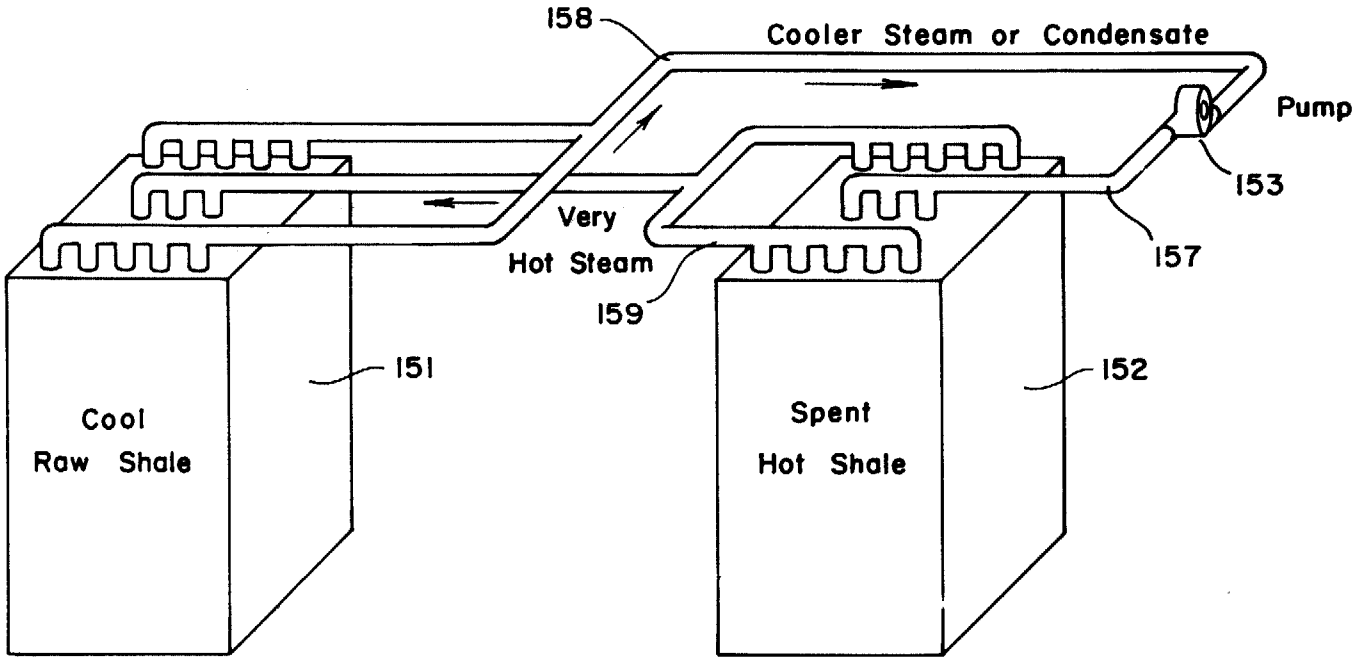
FIG. 15 is a simplified schematic diagram which illustrates how residual heat in "spent" formations can be utilized for pre-heating resources to be subsequently processed.

In either version of the process, a relatively high degree of porosity and permeability will be present after removal of the liquid kerogen. Thus, if desirable, subsequent recovery of the carbonaceous residue on the spent shale could be achieved by injection of steam and either air or oxygen to initiate a "water-gas" reaction. Upon injection, the steam and oxygen react with the carbonaceous residue to form a low BTU gas which is recovered and can be used, for example, for the hydrogenation of the raw shale oil, or for on-site generation of electric power. The water-gas reaction would also result in a higher spent shale temperature, for example 600° C., than in the case of the first processing version. This would be advantageous when techniques, such as those described below in conjunction with FIGS. 15, 16, are employed for using residual heat for preheating the raw shale in other blocks in the shale bed. An overall saving of electrical energy would thereby be achieved. The creation of shale permeability and wetability after removal of the liquid kerogen would also permit extraction, in situ, of various coproducts such as aluminum hydroxide, nahcolite, uranium or related minerals present in the shale by leaching methods.

In a third processing version, the electrical heating techniques of the invention are employed only to relatively lower temperatures, below about 200° C. to obtain fast fracturing of the shale by vaporization of moisture content, whereupon combustion or thermal in situ extraction techniques can be used to obtain the useful products.

It will be understood that various "hybrid" extraction approaches, which include the electrical heating techniques of this invention, can be employed, depending upon the type of oil shale formations in a particular region, availability of electrical energy, and other factors relating to costs. For example, the disclosed electrical radio frequency heating techniques could be employed in either the middle range temperatures or to "top off" temperature distributions obtained by other heating methods.

Applicants have observed that raw unheated tar sand, heavy oil matrices, and partially depleted petroleum deposits exhibit dielectric absorption characteristics at radio frequencies which render possible the use of the present techniques for heating of such deposits (tar sands being generally referred to hereafter, for convenience) so that bitumen can be recovered therefrom. Again, the relatively low electrical conductivity and relatively low thermal conductivity of the tar sands is not an impediment (as in prior art techniques) since dielectric heating is employed. The selection of a suitable range of frequencies in the radio frequency band is based on considerations that are similar to those set forth above. If the selected frequencies of operation are too high, the penetration of energy into the deposit is too shallow (i.e., a small skin depth, as discussed above) and relatively large volumes of in situ material cannot be advantageously processed due to large non-uniformities of heating. On the other hand, if the frequency of operation is selected below a certain range, the absorption of energy per unit volume will be relatively low (since dielectric absorption is roughly proportional to frequency over the range of interest), so the amplitude of the electrical excitation must be made relatively large in order to obtain the necessary heating to prevent processing times from becoming inordinately long. However, practical considerations limit the degree to which the applied excitation can be intensified without the risk of electrical breakdown. Thus, once a maximum excitation amplitude is selected, the minimum frequency is a function of desired processing time. Applicants have discovered that the dielectric absorption characteristics of tar sands are generally in a range similar to that described above in conjunction with oil shale, but somewhat lower frequencies within the radio frequency range are anticipated. However, it will be understood that variations in the optimum frequencies will occur for different types of mineral deposits, different confining structures, and different heating time objectives.

Figure 14:
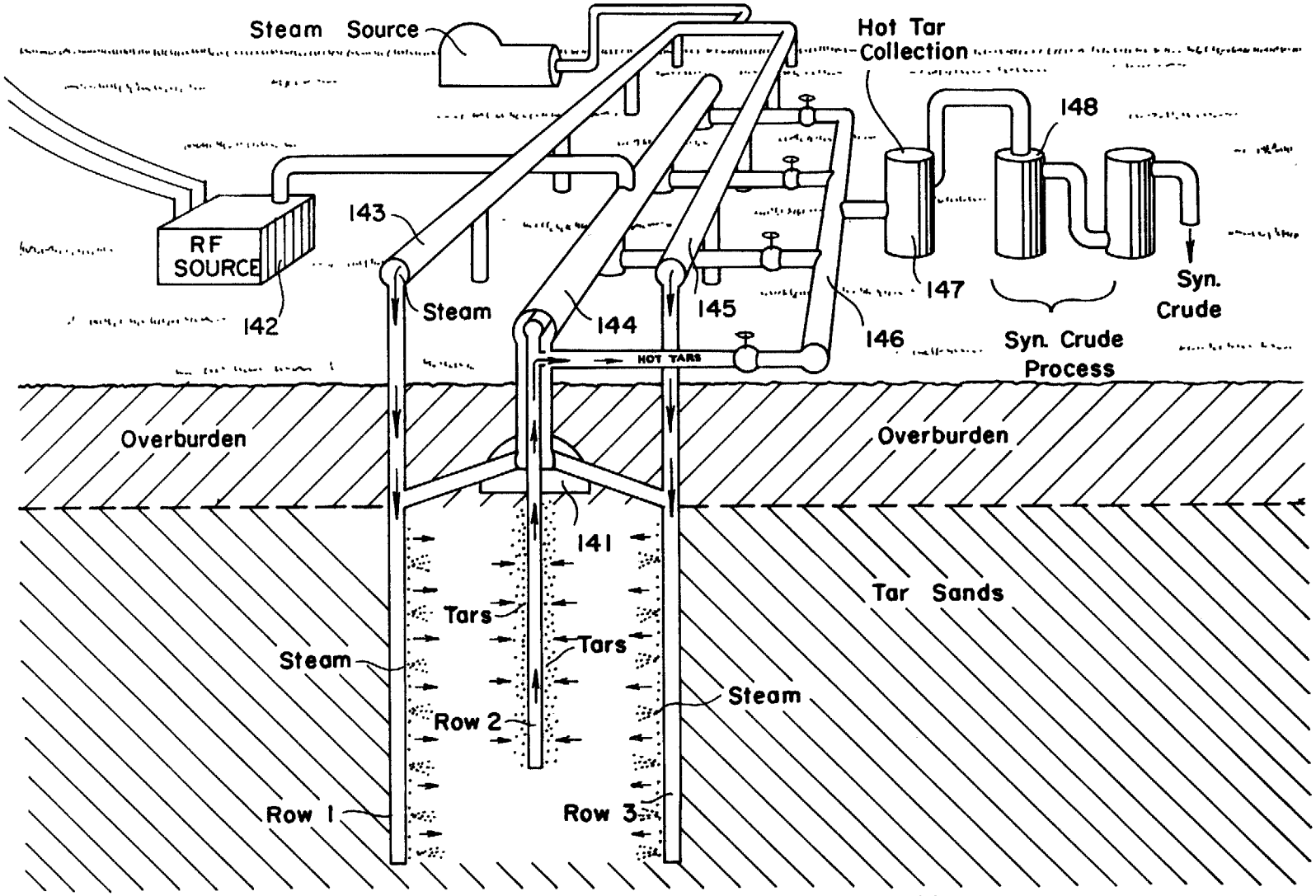
FIG. 14 is a simplified schematic diagram of a system and facility for recovery of useful constituents from a tar sand formation.

In FIG. 14 there is shown a simplified schematic diagram of a system and facility for recovery and processing of bitumen from a subterranean tar sand formation. A triplate-type configuration is again utilized with three rows of boreholes, designated at row 1, row 2 and row 3, being drilled or driven through the overburden and into the tar sand formation, as in FIG. 13. A drift 141 is mined in the overburden above the tar sand formation so that electrical connections can be made in the manner described in conjunction with FIG. 6. Again, tubular conductors are inserted into the lower portions of the boreholes of each row. An RF source 142 is provided and, as before, for ease of illustration, the electrical connections are not shown in FIG. 14, although they may be the same as those of FIG. 6. As in FIG. 13, a network of pipes for injection of suitable drive media is provided, the horizontal feedpipes 143 and 145 being coupled to the boreholes of row 1 and row 3, respectively, in this instance. Pipe 146 is the main collection pipe and suitable valves and cross-couplings are also provided. In the present instance, after suitable heating of the resource, steam or hot chemical solutions can typically be injected into at least some of the boreholes and the hot mobile tars are forced to the surface for collection via collection pipes 144 and 146 and collection tank 147. Subsequent processing of the recovered tars is a well developed art and will not be described herein. In the illustration of FIG. 14, the boreholes of rows 1 and 3 are utilized as "injection wells" and the boreholes of rows 2 are used as "production wells", although it will be understood that various alternate techniques can be used for bringing the heated tars to the surface.

As in the case of oil shale, it will be recognized that electrical heating can be advantageously performed to different degrees in order to implement useful extraction of the organic resources from the tar sand formations.

In a first version of the tar sand or heavy oil recovery technique, electrical heating is applied to reduce the viscosity of the in-place tars or heavy oils to a point where other known complementary processes can be employed to recover the in-place fuels. In such case, radio frequency electrical energy can be applied to relatively uniformly heat a block of tar sands to a temperature of about 150° C. This, in effect, produces a volume of low viscosity fluids in the tar sand matrix which is effectively sealed around its periphery by the lower temperature (impermeable or less permeable) cooler tar sands. Simple gravity flow into producer holes or a pressurized drive, consistent with FIG. 14, can be used to force the low viscosity fluids to the surface using injection of hot fluids.

In a second version of the technique, useful fuels are recovered from tar sand and heavy oil deposits by partially or completely pyrolyzing the tars in situ. Electrical radio frequency energy is applied in accordance with the principles of the invention to heat a relatively large block of tar sand in situ to about 500° C. As the temperature of the tar sand increases above about 100° C., the inherent moisture begins to change into steam. A further increase in temperature to around 150° C. substantially reduces the viscosity of in-place tars or heavy oils. As the pyrolysis temperature is approached, the higher volatiles are emitted until complete pyrolysis of the in-place fuels is accomplished. The tar sands nearest the electrodes will be heated slightly more rapidly than the tar sands farther away, so regions of relatively low viscosity and high permeability will be progressively established outward from the electrodes. This permits passage of the high volatiles and pyrolytic product vapors up the boreholes for collection with or without a drive. A variation of this second version would subsequently employ a water gas process, as described above, to produce a low BTU gas from the remaining pyrolytic carbon. Also, simple combustion of carbon residues can be utilized in order to recover residual energy in the form of sensible heat. It will be understood that various combinations or sequences of the described steps can be performed, as desired.

Referring to FIG. 15, there is shown a schematic diagram which illustrates how residual heat in the "spent" formations from which constituents have already been extracted can be utilized for pre-heating of the next block of the resource to be processed. After the boreholes are formed in the new zone to be heat processed, a system of pipes can be utilized to carry steam-water mixtures which effectively transfers residual heat from the just-processed zone to the next zone to be processed. In FIG. 15, the relatively cool raw resource bed to be processed is illustrated by the block 151, and the spent hot resource is represented by the block 152. The water pumped into the block 152 via pump 153 and feed pipe 157 becomes very hot steam which is circulated through the pipes 159 to the block 151. The system is "closed loop" so that after heat from the steam is expended in the block 151, it is returned as cooler steam or condensate to the block 152 via return pipe 158. It will be understood that the sequentially processed zones may be adjacent zones to take advantage of thermal flow outside a volume being processed. In particular, heat which flows outside the volume being processed, which might normally be wasted, can be utilized in preheating zones to be subsequently processed. Thus, for example, rows defining zones in the formations being processed can alternate with and "sandwich" zones to bo subsequently processed so that heat which flows out of the zones presently being processed can be, to a substantial extent, utilized later. This technique, along with the use of residual heat in the "spent" formations, as described in conjunction with FIG. 15, can substantially reduce the amount of total input energy needed for heat processing.

The present invention allows maximum extraction of desired organic products while keeping pollution and waste accumulation to a minimum and still being economically advantageous. Very little mining, if any, is required and the pollution and waste aspects of above ground retorting are, of course, absent. The invented technique compares most favorably with those in situ techniques that require combustion, since those techniques necessarily produce hot flue gases that must be cleaned of particulates, sulfur, etc. before release into the invironment. A further advantage is a result of the relatively close control over the heating zone which is a feature of the present invention and greatly reduces the possibility of uncontrolled in situ combustion which can have adverse safety and/or environmental effects.

The invention has been described with reference to particular embodiments, but variations within the spirit and scope of the invention will occur to those skilled in the art. For example, the term "boreholes" as used herein is intended generically to include any type of hole or slot in the formation formed by any suitable means such as mechanical or water-jet drilling, pile driving, etc., as well as forms of mining or excavation. Also, the field confining conductors of the present invention can be of any desired form, including meshes, straps, or flexible foils, and will depend, to some degree, upon the location and exposure of the particular surface of the volume they confine. Further, it will be understood that in addition to the resonant TEM type of lines described herein, the confining structure can also take the form of single-mode TE or TM in situ waveguides or multi-mode enclosed cavities. In both instances, standing-wave correction, as previously described, can be employed to substantially average over time the electric field (and resultant heating) throughout the confined volume, both electrical and mechanical techniques being available as disclosed hereinabove. The excitation frequency can also be varied during operation. In the case of a cavity, appropriate drifts or adits can be mined to obtain access to drilling locations (e.g. as illustrated in FIG. 7) so that conductors can be positioned to define surfaces that completely confine a volume to be heated. The resultant "in situ cavity" would be somewhat similar in operation to a microwave oven (but with radio frequency energy being utilized). Mode mixing can be achieved, for example, by utilizing a multiplicity of electric and/or magnetic dipoles at different locations on the walls or within the cavity and sequentially exciting them to obtain different modes to achieve substantially uniform heating of the confined volume. Alternatively, conductors can be inserted and withdrawn from a series of boreholes, as previously described. The cavity approach is advantageous due to the absence of geometrical constraints pertaining to achieving cutoff of potentially radiating wave energy. This means that larger blocks of the resource can be processed at once.

Figure 17:
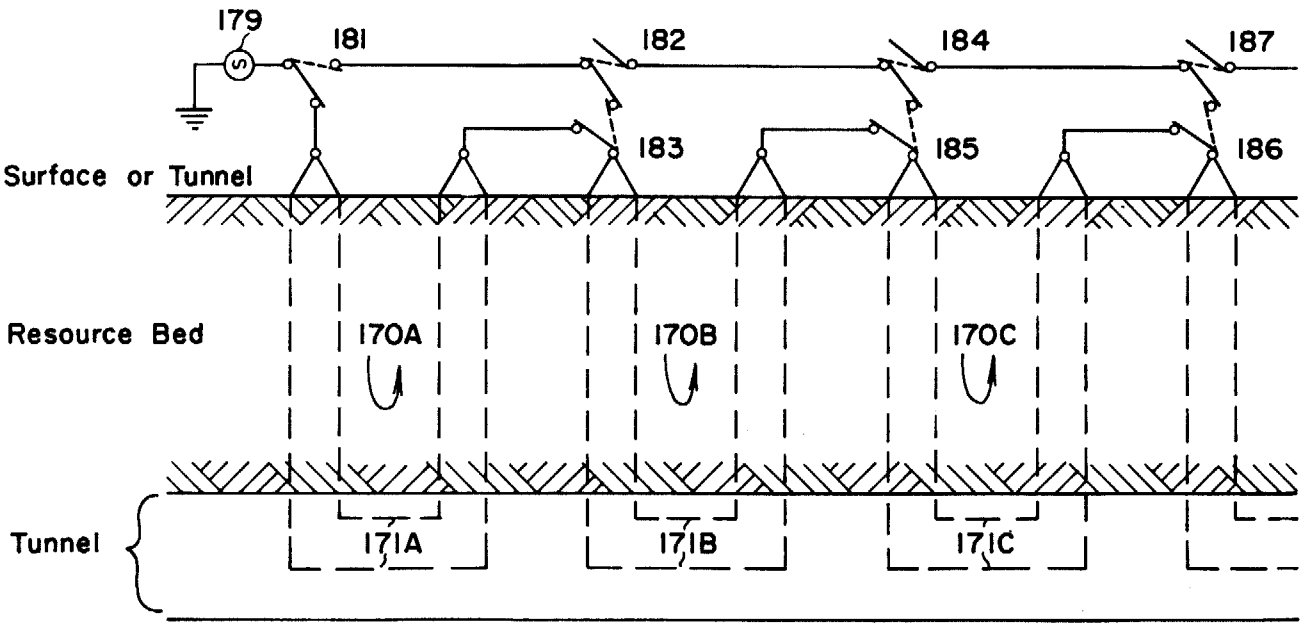
FIG. 17 shows a diagram of a non-resonant processing technique.

Further, it will be understood that non-resonant confining structures can be utilized, if desired. For example, FIG. 17 is a simplified diagram illustrating how a non-resonant confining structure can be utilized in conjunction with a "sandwich" type of processing technique that utilizes thermal flow from spent regions. Three "loops" designated as loop 170A, 170B, and 170C, are illustrated, each loop including, for example, a pair of tri-plate lines of the type illustrated in FIG. 4. However, in this instance the central row of each tri-plate line is not intentionally truncated. Instead, connecting lines designated by reference numerals 171A, 171B and 171C are employed, this being done by inserting appropriate horizontal conductors from a mined tunnel. Switches 181–187 are provided and are intially positioned as shown in FIG. 17. In operation, the loops are first connected in series and the switch 181 is coupled to the RF source 179. Wave energy is introduced into the first tri-plate line of loop 170A and travels around the loop and is then connected via switch 183 to loop 170B, and so on. Dielectric heating of the hydrocarbonaceous formations is achieved, with the electric field being progressively attenuated. Accordingly, the loop 170A is heated more than the loop 170B which is heated more than the loop 170C, etc. When the hydrocarbonaceous deposit of loop 170A has been heated to a desired degree, switches 181 and 183 are switched so that loop 170A is no longer energized and loop 170B is now heated to the greatest extent. This procedure is continued until the alternate layers of hydrocarbonaceous formations are fully heated to the extent desired. After a suitable period of time, typically weeks or months, for the heat from the spent regions to transfer into the between-loop formations, the between-loop formations can be processed in similar manner.

As previously noted, the invention is applicable to various types of hydrocarbonaceous deposits, and variations in technique, consistent with the principles of the invention, will be employed depending upon the type of resource being exploited. For example, in the case of coal, the electrical properties of the material indicates that the lower portion of the radio frequency spectrum, for example of the order of 100 KHz, will be useful. Further, it will be understood that as heat processing of a particular resource progresses, the properties of the resource can change and may render advantageous the modification of operating frequency for different processing stages.

Applicants have observed that the raw materials under consideration can tend to exhibit different dielectric properties at different temperatures. As a consequence, it may be desirable to modify electrical parameters to match the characteristics of the AC power source to the characteristics of the field exciting structure whose properties are influenced by the different dielectric properties of the raw materials. A variable matching network, such as is represented by block 451 (in dashed line) of FIG. 4A, can be used towards this end.

We claim:

1. A system for in situ heat processing of hydrocarbonaceous earth formations, comprising:

a plurality of conductive means inserted in said formations and bounding a particular volume of said formations;

electrical excitation means for establishing alternating electric fields in said volume;

the frequency of said excitation means being selected as a function of the volume dimensions so as to establish substantially non-radiating electric fields which are substantially confined in said volume;

whereby volumetric dielectric heating of the formations will occur to effect approximately uniform heating of said volume.

2. A system as defined by claim 1 wherein the frequency of said excitation is in the radio frequency range.

3. A system as defined by claim 2 wherein said conductive means comprise opposing spaced rows of conductors disposed in opposing spaced rows of boreholes in said formations.

4. A system as defined by claim 3 wherein the conductors of each row comprise spaced elongated conductors.

5. A system as defined by claim [4] *20* wherein said excitation is applied as a voltage as between the conductors of the outer rows and the conductors of the central row.

6. A system as defined by claim 4 wherein said electrical excitation is a source of current applied to at least one current loop in said volume.

7. A system as defined by claim 4 wherein said electrical excitation is applied across at least one electrical dipole in said volume.

8. A system as defined by claim 4 wherein the conductors of the central row are of substantially shorter length than the conductors of the outer rows so as to reduce radiation at the ends of said conductors.

9. A system as defined by claim 8 wherein the frequency of said excitation is selected such that a half wavelength of electromagnetic energy in the region beyond the center conductor is substantially greater than the spacing between the outer rows to give rise to a cutoff condition in said region.

10. A system as defined by claim 9 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

11. A system as defined by claim 9 further comprising means for modifying the electric field pattern so as to average the electric field intensity in said volume to enhance the uniformity of heating of said volume.

12. A system as defined by claim 8 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

13. A system as defined by claim 8 further comprising means for modifying the electric field pattern so as to average the electric field intensity in said volume to enhance the uniformity of heating of said volume.

14. A system as defined by claim 2 wherein said excitation in applied as to a voltage as between different groups of said conductive means.

15. A system as defined by claim 2 wherein said electrical excitation is a source of current applied to at least one current loop in said volume.

16. A system as defined by claim 2 wherein said electrical excitation is applied across at least one electrical dipole in said volume.

17. A system as defined by claim 2 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

18. A system as defined by claim 2 further comprising means for modifying the electric field pattern so as to average the electric field intensity in said volume to enhance the uniformity of heating of said volume.

19. A system as defined by claim 1 wherein said conductive means comprise opposing spaced rows of conductors disposed in opposing spaced rows of boreholes in said formations.

20. A system as defined by claim 19 wherein said rows of conductors comprise three spaced rows of conductors.

21. A system as defined by claim 20 wherein the conductors of each row comprise spaced elongated conductors.

22. A system as defined by claim 21 wherein said excitation is applied as a voltage as between the conductors of the outer rows and the conductors of the central row.

23. A system as defined by claim 22 wherein the conductors of the central row are of substantially shorter length than the conductors of the outer rows so as to reduce radiation at the ends of said conductors.

24. A system as defined by claim 23 wherein the frequency of said excitation is selected such that a half wavelength of electromagnetic energy in the region beyond the center conductor is substantially greater than the spacing between the outer rows to give rise to a cutoff condition in said region.

25. A system as defined by claim 21 wherein said electrical excitation is a source of current applied to at least one current loop in said volume.

26. A system as defined by claim 25 wherein the conductors of the central row are of substantially shorter length than the conductors of the outer rows so as to reduce radiation at the ends of said conductors.

27. A system as defined by claim 26 wherein the frequency of said excitation is selected such that a half wavelength of electromagnetic energy in the region beyond the center conductor is substantially greater than the spacing between the outer rows to give rise to a cutoff condition in said region.

28. A system as defined by claim 21 wherein said electrical excitation is applied across at least one electrical dipole in said volume.

29. A system as defined by claim 20 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

30. A system as defined by claim 29 wherein said rows of conductors are inserted in said formations at angles such that said rows are closer together at far ends thereof to compensate for attenuation of the electrical field at said far end.

31. A system as defined by claim 20 further comprising means for modifying the electric field pattern so as to average the electric field intensity in said volume to enhance the uniformity of heating of said volume.

32. A system as defined by claim 31 wherein said means for modifying the electric field pattern comprises means for modifying the effective length of the conductors of the central row.

33. A system as defined by claim 32 wherein said means for modifying the effective length of the conductors of the central row comprises means for physically shortening the length of said conductors.

34. A system as defined by claim 32 wherein said means for modifying the effective length of said conductors comprises means for electrically modifying the effective length thereof.

35. A system as defined by claim 20 wherein said rows of conductors are inserted in said formations at angles such that said rows are closer together at far ends thereof to compensate for attenuation of the electrical field at said far end.

36. A system as defined by claim 19 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

37. A system as defined by claim 19 further comprising means for modifying the electric field pattern so as to average the electric field intensity in said volume to enhance the uniformity of heating of said volume.

38. A system as defined by claim 19 wherein said rows of conductors are inserted in said formations at angles such that said rows are closer together at far ends thereof to compensate for attenuation of the electrical field at said far end.

39. A system as defined by claim 1 wherein said excitation is applied as a voltage as between different groups of said conductive means.

40. A system as defined by claim 39 wherein the conductors of the central row are of substantially shorter length than the conductors of the outer rows so as to reduce radiation at the ends of said conductors.

41. A system as defined by claim 1 wherein said electrical excitation is a source of current applied to at least one current loop in said volume.

42. A system as defined by claim 1 wherein said electrical excitation is applied across at least one electrical dipole in said volume.

43. A system as defined by claim 1 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

44. A system as defined by claim 43 further comprising means for modifying the electric field pattern so as to average the electric field intensity in said volume to enhance the uniformity of heating of said volume.

45. A system as defined by claim 1 further comprising means for modifying the electric field pattern so as to average the electric field intensity in said volume to enhance the uniformity of heating of said volume.

46. A method for in situ heating of hydrocarbonaceous earth formations, comprising the steps of:

forming a plurality of boreholes which bound a particular volume of said formations;

inserting elongated electrical conductors in said boreholes; and introducing electrical excitation to said formations to establish alternating electric fields in said volume;

the frequency of said excitation being selected as a function of the volume dimensions so as to establish substantially non-radiating electric fields which are substantially confined in said volume;

whereby volumetric dielectric heating of the formations will occur to effect approximately uniform heating of said volume.

47. A method as defined by claim 46 wherein the frequency of said excitation is in the radio frequency range.

48. A method as defined by claim 47 wherein the step of introducing electrical excitation comprises applying a voltage as between different groups of said conductors.

49. A method as defined by claim 47 wherein the step of introducing electrical excitation comprises applying electrical current to at least one current loop in said volume.

50. A method as defined by claim 47 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

51. A method as defined by claim 47 further comprising the step of modifying the electric field pattern so as to average the electric field intensity in said volume to enhance the uniformity of heating of said volume.

52. A method as defined by claim 51 wherein the step of modifying the electric field pattern comprises the step of modifying the effective length of some of said conductors.

53. A method as defined by claim 47 further comprising the step of withdrawing through said boreholes the valuable constituents resulting from said heating.

54. A method as defined by claim 47 wherein said dielectric heating is continued to heat said volume to a temperature below the temperature required for extraction of valuable constituents from said volume, and further comprising the steps of applying further nonelectrical heating means to said volume and withdrawing through said boreholes valuable constituents from said volume.

55. A method as defined by claim 46 wherein said boreholes are formed in opposing spaced rows in said formations.

56. A method as defined by claim 55 wherein said rows comprise three spaced rows.

57. A system for in situ heat processing of an oil shale bed, comprising:

a plurality of conductive means bounding a particular volume of said bed;

electrical excitation means for establishing alternating electric fields in said volume;

the frequency of said excitation means being selected as a function of the volume dimensions so as to establish substantially non-radiating electric fields which are substantially confined in said volume;

whereby volumetric dielectric heating of the bed will occur to effect approximately uniform heating of said volume.

58. A system as defined by claim 57 wherein the frequency of said excitation is in the radio frequency range.

59. A system as defined by claim 57 wherein the frequency of said excitation is in the range between about 1 MHz and 40 MHz.

60. A system as defined by claim 59 wherein said conductive means comprise opposing spaced rows of conductors disposed in opposing spaced rows of boreholes in said bed.

61. A system as defined by claim 60 wherein said rows of conductors comprise three spaced rows of conductors.

62. A system as defined by claim 61 wherein the conductors of the central row are of substantially shorter length than the conductors of the outer rows so as to reduce radiation at the ends of said conductors.

63. A system as defined by claim 62 wherein the frequency of said excitation is selected such that a half wavelength of electromagnetic energy in the region beyond the center conductor is substantially greater than the spacing between the outer rows to give rise to a cutoff condition in said region.

64. A system as defined by claim 59 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

65. A system as defined by claim 57 wherein said conductive means comprise opposing spaced rows of conductors disposed in opposing spaced rows of boreholes in said bed.

66. A system as defined by claim 57 wherein the frequency of said excitation is selected as a function of the electrical lossiness of the formations in said volume to be sufficiently low such that the l/e attenuation distance of the electric field in any direction in said volume is more than twice the physical dimension of said volume in that direction.

67. A system for in situ heat processing of a tar sand deposit, comprising:

a plurality of conductive means inserted in said deposit and bounding a particular volume of said deposit;

electrical excitation means for establishing alternating electric fields in said volume;

the frequency of said excitation means being selected as a function of the volume dimensions so as to establish substantially non-radiating electric fields which are substantially confined in said volume;

whereby volumetric dielectric heating of the deposit will occur to effect approximately uniform heating of said volume.

68. A system as defined by claim 67 wherein the frequency of said excitation is in the radio frequency range.

69. A system as defined by claim 68 wherein the frequency of said excitation is selected as a function of the electrical lossiness of the formations in said volume to be sufficiently low such that the skin depth of the electric field in any direction in said volume is more than twice the physical dimension of said volume in that direction.

70. A system as defined by claim 67 wherein the frequency of said excitation is selected as a function of the electrical lossiness of the formations in said volume to be sufficiently low such that the skin depth of the electric field in any direction in said volume is more than twice the physical dimension of said volume in that direction.

*71. A system for in situ heat processing of hydrocarbonaceous earth formations, comprising:*

*a waveguide structure comprising a plurality of elongate electrodes and configured such that the direction of propagation of aggregate modes of wave propagation therein is approximately parallel to an elongate axis of said electrodes and bounding a particular volume of earth formations as a dielectric medium bounded therein; and*

*means for supplying electromagnetic energy to said waveguide structure at a frequency selected to confine said electromagnetic energy in said structure and to dissipate said electromagnetic energy to the earth formations, thereby to substantially uniformly heat the bounded volume.*

*72. A system for in situ heat processing of hydrocarbonaceous earth materials, comprising:*

*a waveguide structure having an elongate shape which penetrates and bounds a particular volume of earth formations therein and wherein the aggregate direction of propagation of electromagnetic wave modes in said structure is in a direction approximately parallel to an elongate axis of said structure; and*

*means for supplying electromagnetic energy to said waveguide structure at a frequency selected to confine said energy and to dissipate said electromagnetic energy to said bounded volume thereby to substantially uniformly heat said bounded volume.*

*73. A system for in situ heat processing of hydrocarbonaceous earth formations, comprising:*

*field confining means bounding a particular volume of earth formations and forming an elongate waveguide structure having a direction of aggregate electromagnetic wave propagation mode direction in a direction approximately parallel to an elongate axis of said structure; and*

*means for supplying electromagnetic energy to said waveguide structure at a frequency to confine said electromagnetic energy in said structure and to cause dielectric heating of said bounded volume to a substantially uniform degree.*

*74. A system for in situ heat processing of hydrocarbonaceous earth formations comprising:*

*a plurality of electrodes placed in a pattern bounding a particular volume of hydrocarbonaceous earth formation, said pattern defining a waveguide structure having said volume bounded therein as a dielectric medium; and,*

*means for applying an alternating current to said electrodes in the frequency range of the order of 100 kilohertz to 100 megahertz, the frequency of said current being selected as a function of a volume dimension so as to establish substantially non-radiating and uniform electromagnetic fields in said volume, thereby obtaining volumetric dielectric heating of said volume to a temperature sufficient to permit production of hydrocarbonaceous components thereof.*

*75. A system of in situ heat processing of hydrocarbonaceous earth formations comprising:*

*a pattern of conductors bounding a particular volume of hydrocarbonaceous earth formation, said pattern defining an unbalanced transmission line structure having said bounded volume integral therewith as a dielectric medium; and*

*means for supplying alternating current in the frequency range of the order of 100 kilohertz to 100 megahertz, to said conductors, the frequency of said current being selected as a function of at least one volume dimension so as to establish substantially non-radiating electromagnetic fields in said volume.*

*76. A system for in situ heat processing of hydrocarbonaceous earth formations comprising:*

*a substantially tri-plate pattern of electrodes placed in a particular volume of hydrocarbonaceous earth formation and forming a waveguide structure having said volume bounded therein as a dielectric medium wherein adjacent portions of electrodes within a plate are at approximately the same potential; and*

*means for supplying a time varying electric field in the frequency range from 100 kilohertz to 100 megahertz to said electrodes so as to establish substantially non-radiating electric fields in said volume.*

*77. A system for in situ heat processing of hydrocarbonaceous earth formations comprising:*

*waveguide means formed by a pattern of electrodes placed in a particular volume of hydrocarbonaceous earth formation to bound said volume therein as a dielectric medium; and*

*means for supplying alternating current to said waveguide structure at a frequency of the order of from 100 kilohertz to 100 megahertz to effectively confine electromagnetic fields in said structure and to effect substantially uniform dielectric heating of said volume.*

*78. A system for in situ heat processing of hydrocarbonaceous earth formations comprising:*

*an unbalanced transmission line structure deployed in a particular volume of hydrocarbonaceous earth formation, said structure bounding said volume and employing said formation material as a dielectric medium therein; and*

*means for supplying electrical energy having a frequency of the order of from 100 kilohertz to 100 megahertz to said transmission line structure, thereby confining said energy in said structure and providing dielectric heating to a controllable degree in said volume.*

*79. A system for in situ heat processing of hydrocarbonaceous earth formations comprising:*

*a waveguide structure formed by bounding a particular volume of earth formations with a pattern of electrodes bounding said volume and including said volume as a dielectric medium therein; and*

*means for establishing alternating electromagnetic fields in the frequency range between 100 kilohertz and 100 megahertz in said bounded volume, the frequency of said alternating fields being selected as a function of a volume dimension, thereby causing volumetric dielectric heating of said volume to an approximately uniform degree.*

*80. A system for in situ heat processing of hydrocarbonaceous earth formations comprising:*

*electrode means bounding a particular volume of earth formations in such a manner as to comprise a waveguide structure having said volume bounded therein as a dielectric medium; and*

*means for supplying electromagnetic energy to said waveguide structure at a frequency selected to confine said energy substantially in said volume and to cause heating of said volume by displacement currents to a substantially uniform degree in said volume.*

*81. A system for in situ heat processing of hydrocarbonaceous earth formations, comprising:*

*electrode means bounding a particular volume of earth formations in such a manner as to comprise an unbalanced transmission line structure having said volume bounded therein as a dielectric medium; and*

*means for supplying electromagnetic energy to said unbalanced transmission line at a frequency selected to cause heating of said volume by displacement currents to a substantially uniform degree in said volume.*

*82. A system for in situ heat processing of hydrocarbonaceous earth formations comprising:*

*electrode means bounding a particular volume of earth formations in such a manner as to comprise an approximately tri-plate transmission line structure hav-*

*ing said volume bounded therein as a dielectric medium; and*

*means for supplying electromagnetic energy to said triplate transmission line structure at a frequency and field intensity selected to cause heating of said volume to a substantially uniform degree in said volume without significant heat loss to the adjacent unbounded regions and without electrical breakdown of said bounded volume.*

*83. A system for in situ heat processing of hydrocarbonaceous earth formations, comprising*

*a waveguide structure comprising a plurality of electrodes bounding a particular volume of earth formations as a dielectric medium bounded therein; and*

*means for supplying electromagnetic energy to said waveguide structure at a frequency selected to dissipate said electromagnetic energy substantially only to said bounded medium thereby to substantially uniformly heat said bounded volume.*

*84. A system for in situ heat processing of hydrocarbonaceous earth formations, comprising:*

*an unbalanced transmission line structure comprising a plurality of electrodes bounding a particular volume of earth formations as a dielectric medium bounded therein; and*

*means for supplying electromagnetic energy to said unbalanced transmission line structure at a frequency selected to substantially confine said energy to said structure and to dissipate said electromagnetic energy to said dielectric medium by displacement current heating thereof, thereby to substantially uniformly heat said bounded volume without significant heat loss to the adjacent unbounded regions and without electrical breakdown of said bounded volume.*

*85. A system for in situ heat processing of hydrocarbonaceous earth formations, comprising:*

*an approximately tri-plate transmission line structure comprising a plurality of electrodes bounding a particular volume of earth formations as a dielectric medium bounded therein; and*

*means for supplying electromagnetic energy to said approximately tri-plate transmission line structure at a frequency and field intensity selected to dissipate said electromagnetic energy to said dielectric medium, thereby to substantially uniformly heat said bounded volume without significant heat loss to the adjacent unbounded regions and without electrical breakdown of said bounded volume.*

*86. A system for in situ heating a volume of hydrocarbonaceous earth formation to an elevated temperature comprising:*

*electrical excitation means for providing an electrical waveform of a frequency of the order of from 100 kilohertz to 100 megahertz;*

*a conductor array located approximately centrally in said volume to which the electrical waveform is applied, said central conductor array comprising a line of conductors inserted in boreholes in the formation, wherein adjacent conductors in the line are separated by a distance of about ⅛ of a wavelength of less of the electrical waveform; and*

*a bounding conductor array comprising at least one line of electrical conductors inserted in boreholes in the formation, adjacent of said conductors in a line being separated by about ⅛ of a wavelength or less of the electrical waveform wherein bounding conductors are at approximately the same potential as the adjacent unbounded earth formations whereby radiation of electrical energy outside the volume of the hydrocarbonaceous earth formation is minimized.*

*87. A method of heating a volume of hydrocarbonaceous earth formations to an elevated temperature comprising:*

*applying an electrical waveform to a first row of elongated conductors penetrating a volume of the formation, adjacent conductors being separated by a distance less than ⅛ of the wavelength of the electrical waveform;*

*confining the electromagnetic field in the volume by bounding said volume with at least two rows of elongated conductors, adjacent conductors in a row being separated by a distance less than ⅛ of the wavelength of the electrical waveform; and*

*varying at least one of; (a) the frequency of the electrical waveform; (b) the physical length of individual conductors in a row of conductors, (c) the series capacitance of conductors in a row; (d) the effective electrical length of conductors in a row; to facilitate uniform heating of the formation in the direction of the principal axis of the elongated conductors.*

*88. A method for in situ heat processing of hydrocarbonaceous earth formations comprising the steps of:*

*placing a plurality of electrodes into a particular volume of hydrocarbonaceous material in a pattern which bounds said volume and defines an unbalanced transmission line structure having said bounded volume present as a dielectric medium bounded therein;*

*applying alternating current at a radio frequency on the order of from 100 kilohertz to 100 megahertz to said electrodes, said radio frequency being chosen as a function of a volume dimension so as to establish substantially non-radiating electromagnetic fields which are substantially confined in said volume, thereby effecting approximately uniform heating of said volume to a temperature sufficient to permit production of hydrocarbonaceous components thereof.*

*89. A method for in situ heating processing of hydrocarbonaceous earth formations comprising the steps of:*

*placing a plurality of electrodes into a particular volume of hydrocarbonaceous material in a pattern which bounds said volume and defines a waveguide structure having said bounded volume present as a dielectric medium bounded therein;*

*applying alternating current at a radio frequency on the order of 100 kilohertz to 100 megahertz to said electrodes, said radio frequency being chosen as a function of at least one volume dimension so as to establish substantially nonradiating electromagnetic fields which are substantially confined in said volume, thereby effecting approximately uniform heating;*

*modifying the electromagnetic field pattern so as to time average the electromagnetic field in said volume to enhance the uniformity of heating of said volume.*

*90. A method for in situ heat processing of hydrocarbonaceous earth formations, comprising the steps of:*

*forming a plurality of holes which bound a particular volume of hydrocarbonaceous material and spaced from each other so as to define an approximately triplate structure having said bounded volume of hydrocarbonaceous material present as a dielectric medium bounded therein;*

*inserting electrical conductors into said holes; and,*

*applying alternating current at a radio frequency on the order of from 100 kilohertz to 100 megahertz to said conductors, said radio frequency being chosen as a function of at least one volume dimension so as to*

*establish substantially nonradiating electromagnetic fields which are substantially confined in said volume, thereby effecting approximately uniform heating of said volume.*

*91. A method for in situ heat processing of hydrocarbonaceous earth formations, comprising the steps of:*

*enclosing a particular volume of earth formations on at least two sides thereof with a plurality of spaced electrodes to define a waveguide structure having said enclosed volume present therein as a dielectric medium; and*

*establishing alternating electromagnetic fields in the frequency range between 100 kilohertz to 100 megahertz in said enclosed volume, the frequency of said alternating fields being selected as a function of a volume dimension, so as to establish substantially non-radiating, confined, electromagnetic fields in said volume, thereby causing volumetric dielectric heating of said volume to effect approximately uniform heating of said volume.*

*92. A method for in situ heat processing of hydrocarbonaceous earth formations comprising the steps of:*

*bounding a particular volume of earth formations with a waveguide structure comprising elongate electrodes having outer electrodes which are at approximately the same potential as the adjacent unbounded earth formations; and*

*propagating electromagnetic energy through the waveguide structure in an aggregate mode of propagation generally parallel to the direction of an elongate axis of said electrodes, thereby substantially confining the electromagnetic energy in the waveguide structure and uniformly heating the bounded volume of earth formations.*

*93. A method for in situ heat processing of hydrocarbonaceous earth formations, comprising the steps of:*

*bounding a particular volume of earth formations with a transmission line structure having an inner elongate shaped propagating electrode structure and an outer elongate shaped electrode structure which is at approximately the same potential as the adjacent unbounded earth formations; and*

*propagating modes of electromagnetic energy in said structure in an aggregate direction generally parallel to an elongate axis of said propagating electrodes, thereby confining said electromagnetic energy in said bounded volume and uniformly heating said bounded volume.*

*94. A system for in situ heat processing of hydrocarbonaceous earth formations, comprising:*

*a multi mode cavity structure comprising a plurality of elongate electrodes and configured such that the direction of wave propagation of a particular mode is parallel to an elongate axis of at least one set of said electrodes, said multi mode cavity structure bounding a particular volume of earth formations as a dielectric medium bounded therein wherein the outermost electrodes are at approximately the same potential as the adjacent unbounded earth formations; and*

*means for supplying electromagnetic energy to said multi mode cavity structure at a frequency selected to confine said electromagnetic energy in said structure and to dissipate said electromagnetic energy to the earth formations; thereby to substantially uniformly heat the bounded volume.*

*95. The system of claim 94 and further including means for time averaging said electromagnetic energy along the direction of propagation, thereby to enhance the uniformity of heating of the bounded volume of earth formations.*

*96. A system for in situ heat processing of hydrocarbonaceous earth formations, comprising:*

*a waveguide structure having a plurality of rows of conductors, the spacing of conductors in a row being less than the spacing of said rows of conductors and bounding a particular volume of earth formations as a dielectric medium bounded therein; and,*

*means for supplying electromagnetic energy to said waveguide structure at a frequency selected to dissipate said electromagnetic energy substantially only to said bounded medium, thereby to substantially uniformly heat said bounded volume.*

*97. The system of claim 96 and further including means for time averaging said electromagnetic energy along a direction of its propagation in said waveguide structure.*

* * * * *

UNITED STATES PATENT AND TRADEMARK OFFICE

CERTIFICATE OF CORRECTION

PATENT NO. : Re. 30,738

DATED : September 8, 1981

INVENTOR(S) : Jack E. Bridges and Allen Taflove

It is certified that error appears in the above—identified patent and that said Letters Patent is hereby corrected as shown below:

Column 1, line 49, change "using" to --Using--.

Column 2, line 8, insert --the-- before "total"; line 31, change "conduits" to --conducts--; line 50, change "ourrents" to --currents--.

Column 3, line 11, change "fratures" to --fractures--.

Column 4, line 29, change "the" to --other--.

Column 5, line 3, change "HMz" to --MHz--; line 27, change "in" to --is--.

Column 6, line 41, change "air" to --aid--.

Column 9, line 38, change "despos-" to --depos---.

Column 10, line 23, change "$E_T$-x" to --$E_T$(x)--.

Column 14, line 62, change "alternative" to --alternatives--.

Column 18, line 29, change "at" to --as--.

Column 19, line 64, change "bo" to --be--.

Column 20, line 13, change "invironment" to --environment--.

Column 27, line 50, change "of" to --for--.

UNITED STATES PATENT AND TRADEMARK OFFICE

CERTIFICATE OF CORRECTION

PATENT NO. : Re. 30,738

DATED : September 8, 1981

INVENTOR(S) : Jack E. Bridges and Allen Taflove

It is certified that error appears in the above—identified patent and that said Letters Patent is hereby corrected as shown below:

Column 29, line 11, insert a colon(:) after "comprising"; line 49, insert --of-- after "heating"; line 60, change "of", third occurrence, to --or--.

Signed and Sealed this

*Fifth* Day of *January 1982*

[SEAL]

*Attest:*

GERALD J. MOSSINGHOFF

*Attesting Officer*

*Commissioner of Patents and Trademarks*